(12) United States Patent
Grant

(10) Patent No.: US 9,166,525 B2
(45) Date of Patent: Oct. 20, 2015

(54) SOLAR TRACKER

(75) Inventor: Thomas Grant, Murcia (ES)

(73) Assignee: SOLTEC ENERGIAS RENOVABLES, S.L. (ES)

( * ) Notice: Subject to any disclaimer, the term of this patent is extended or adjusted under 35 U.S.C. 154(b) by 338 days.

(21) Appl. No.: 13/295,147

(22) Filed: Nov. 14, 2011

(65) Prior Publication Data
US 2013/0037082 A1 Feb. 14, 2013

Related U.S. Application Data

(63) Continuation-in-part of application No. 13/221,210, filed on Aug. 30, 2011.

(30) Foreign Application Priority Data

Aug. 11, 2011 (ES) .................................. 201100916

(51) Int. Cl.
*H01L 31/042* (2014.01)
*H02S 20/20* (2014.01)
(Continued)

(52) U.S. Cl.
CPC ............... *H02S 20/32* (2014.12); *F24J 2/5233* (2013.01); *F24J 2/541* (2013.01); *H02S 20/00* (2013.01); *H02S 20/20* (2014.12); *H02S 20/30* (2014.12); *H02S 30/20* (2014.12);
(Continued)

(58) Field of Classification Search
CPC ... F24J 2/5233; F24J 2/541; F24J 2002/5451; F24J 2002/5462; H02S 20/00; H02S 20/30; H02S 20/32; H02S 30/20
USPC .................................................. 16/230–232
See application file for complete search history.

(56) References Cited

U.S. PATENT DOCUMENTS

| | | | |
|---|---|---|---|
| 4,495,673 A | * | 1/1985 | Khan .............................. 16/232 |
| 6,123,067 A | * | 9/2000 | Warrick ........................ 126/593 |

(Continued)

FOREIGN PATENT DOCUMENTS

| | | | |
|---|---|---|---|
| CN | 101098113 A | | 1/2008 |
| DE | 101 29 633 | * | 12/2002 |

(Continued)

OTHER PUBLICATIONS

Machine translation of DE 101 29 633; Krell, Wolfgang; published Dec. 2002; pp. 1-2.*

(Continued)

*Primary Examiner* — Allison Bourke
*Assistant Examiner* — Edward Schmiedel
(74) *Attorney, Agent, or Firm* — Hess Patent Law Firm LLC; Robert J. Hess

(57) ABSTRACT

The solar tracker comprises a base (1) and a solar panel (2) having first and second opposite ends (2a, 2b). The first end (2a) can be connected to the base (1) by a first shaft (E1) and the second end (2b) can be connected to the base (1) by a second shaft (E2), such that said solar panel (2) can pivot with respect to the base (1) alternately around the first shaft (E1) and around the second shaft (E2) under the drive of a lifting mechanism. An automatic connection/disconnection device connects the second end (2b) of the solar panel (2) to the base (1) while at the same time disconnecting the first end (2a) of the solar panel (2) from the base (1), and vice versa, every time the solar panel (2) reaches a position parallel to the base (1) for inverting the inclination of the solar panel (2) with respect to the base (1).

26 Claims, 14 Drawing Sheets

(51) Int. Cl.
*H02S 20/30* (2014.01)
*H02S 30/20* (2014.01)
*F24J 2/52* (2006.01)
*F24J 2/54* (2006.01)

(52) U.S. Cl.
CPC .. *F24J 2002/5298* (2013.01); *F24J 2002/5455* (2013.01); *F24J 2002/5462* (2013.01); *Y02E 10/47* (2013.01); *Y02E 10/50* (2013.01)

(56) References Cited

U.S. PATENT DOCUMENTS

| | | | |
|---|---|---|---|
| 2007/0039610 A1* | 2/2007 | Head et al. | 126/605 |
| 2007/0251569 A1* | 11/2007 | Shan et al. | 136/246 |
| 2011/0061644 A1 | 3/2011 | Pizzarello | |

FOREIGN PATENT DOCUMENTS

| | | | |
|---|---|---|---|
| DE | 102 16 490 | * | 10/2003 |
| DE | 102009002504 A1 | | 10/2010 |
| WO | WO8200719 A1 | | 3/2004 |
| WO | WO 2009/112602 | * | 9/2009 |

OTHER PUBLICATIONS

Machine translation of DE 102 16 490; Krell, Wolfgang; published Oct. 2003; pp. 1-2.*

Merriam-Webster; Articulation definition; http://www.merriam-webster.com/dictionary/articulation accessed; and printed Feb. 18, 2015.*

* cited by examiner

SOLAR TRACKER

FIELD OF THE ART

The present invention relates to a simple, compact and economical solar tracker suitable for small-sized solar panels with, for example, a single photovoltaic panel. The solar tracker of the present invention includes two alternating parallel rotation shafts behaving like a single rotation shaft for daily tracking in the east-west direction and is provided for being installed with a fixed inclination in the north-south direction considered the most suitable according to the latitude of the geographic site where it is located, although it could also optionally be used for tracking in the north-south direction daily or seasonally. Due to its small size and low weight, the solar tracker of the present invention can also be applied as a portable solar power unit.

BACKGROUND OF THE INVENTION

For better efficiency of solar panels, for example photovoltaic panels, the sun rays should strike them in the most perpendicular direction possible. To that end, solar trackers are usually provided with a first tracking mechanism for orienting the solar panels in the east-west direction and a second tracking mechanism for orienting the solar panels in the north-south direction for the purpose of tracking the relative movements of the sun during the day, including the yearly cycle variations occurring during the seasons. East-west direction tracking is the most important because it involves a movement covering a very broad arc, whereas north-south direction tracking involves a movement covering a considerably smaller arc.

The implementation of the two aforementioned tracking mechanisms in a two-shaft solar tracker entails a complex construction and increase manufacturing cost.

Accordingly, the present invention proposes a light-weight and economical solar tracker provided with a single tracking mechanism for orienting at least one solar panel in the east-west direction, taking into account that the solar panel and the tracking mechanism are supported in a base which can be installed in a stationary manner at a mid-point inclination in the north-south direction according to the latitude of the site where it is installed. The slight loss of efficiency due to tracking in a single shaft is offset with the low cost, light weight, ease of transport and ease of installation of the solar tracker of the present invention.

Document US 2011/0061644 A1 discloses a low-profile solar energy collection system comprising a base for assembling the system on a suitable substrate and a plurality of solar panels arranged next to one another on the base. A first set of solar panels are movable relative to a second set of solar panels for tracking the relative movements of the sun during the day. The solar panels of the first set are arranged in an alternating manner with the solar panels of the second set. In one embodiment, the solar panels of the second set are arranged in a stationary manner and in another embodiment they are movable relative to the solar panels of the first set. A drawback of this system is that in at all times only one set of solar panels, i.e., only half of the solar panels, receive the rays of the sun in suitable conditions.

Document CN 101098113 A describes a solar tracker comprising a horizontal rotating support on which a solar panel is installed having a first lower end connected in a pivoting manner to the horizontal support by a horizontal shaft. A first actuator drives rotational movements of the horizontal rotating support around a vertical shaft for orienting the solar panel in the east-west direction and a second actuator drives a lifting mechanism pivoting the solar panel with respect to the horizontal rotating support around the aforementioned horizontal shaft for orienting the solar panel in the north-south direction according to the relative movements of the sun. A drawback of this solar tracker is that it needs two tracking mechanisms in two orthogonal shafts, making it more expensive and complex.

If for simplicity's sake a person skilled in the art decided to use only the main tracking mechanism in the east-west direction in the solar tracker of the mentioned document CN 101098113 A, it would correspond to the rotational movement of the horizontal support around the vertical shaft, which entails greater constructive complexity in comparison with the pivoting movement mechanism. If the person skilled in the art decided to use the pivoting movement mechanism of the solar panel around the horizontal shaft for tracking in the east-west direction, the angle covered by this mechanism would be insufficient.

DISCLOSURE OF THE INVENTION

The present invention contributes to solving the foregoing and other drawbacks by providing a solar tracker comprising a base on which a solar panel is installed having first and second opposite ends. The aforementioned first and second ends of the solar panel can be connected to said base by respective first and second mutually parallel shafts by means of an automatic connection/disconnection device connecting the second end of the solar panel to the base while at the same time disconnecting the first end of the solar panel from the base, and vice versa, every time the solar panel reaches a position parallel to the base, such that the solar panel can pivot with respect to the base around said first shaft when the first end is connected to the base and the second end is disconnected from the base, and the solar panel can pivot with respect to the base around said second shaft when the second end is connected to the base and the first end is disconnected from the base.

The solar tracker further comprises a lifting mechanism connected to the solar panel in an intermediate region between said first and second ends and a lifting/lowering actuator operatively connected for moving said lifting mechanism and thereby pivoting said solar panel alternately around the first shaft and around the second shaft passing through said position parallel to the base according to the relative movements of the sun. Therefore, the lifting/lowering actuator and the lifting mechanism are configured for pivoting the solar panel between a raised position and a position parallel to the base and the automatic connection/disconnection device is configured for inverting the inclination of the solar panel with respect to the base every time the solar panel reaches the position parallel to the base and the lifting mechanism is driven again for moving the solar panel from the position parallel to the base towards the raised position.

In one embodiment, the first shaft is defined by at least a first journal fixed to the base and at least a corresponding first half-bearing fixed to the solar panel, or vice versa, and the second shaft is defined by at least a second journal fixed to the base and at least a corresponding second half-bearing fixed to the solar panel, or vice versa. The first and second half-bearings are formed, for example, by closed and rounded ends of notches, and are configured and arranged for receiving the corresponding first and second journals in a radial direction when the solar panel reaches the position parallel to the base.

The aforementioned automatic connection/disconnection device comprises at least a first closing element associated with the first half-bearing and a second closing element associated with the second half-bearing. Said first closing element is movable between a closed position, in which the first closing element retains the first journal coupled to the first half-bearing, and an open position, in which the first closing element allows the first journal to move along the corresponding notch and to be coupled and decoupled to/from the first half-bearing. Similarly, said second closing element is movable between a closed position, in which the second closing element retains the second journal coupled to the second half-bearing, and an open position, in which the second closing element allows the second journal to move along the corresponding notch and to be coupled and decoupled to/from the second half-bearing.

In one embodiment, the automatic connection/disconnection device includes at least one linking member kinematically linking said first and second closing elements to one another such that when the first closing element is moved to said open position the second closing element is moved to said closed position, and vice versa. At least one elastic element is installed in a flip-flop arrangement whereby said elastic element pushes one of the first and second closing elements towards the closed position and towards the open position from an intermediate neutral position, and the other closing element follows the opposite movements in accordance with the link kinematically provided by the linking member, although alternatively the automatic connection/disconnection device can include a first elastic element installed in a flip-flop arrangement associated with the first closing element and a second elastic element installed in a flip-flop arrangement associated with the second closing element.

In this embodiment, the automatic connection/disconnection device further comprises a first activation lever positioned such that it is pushed from a stand-by position to an activation position by an element attached to the base or to the solar panel when the solar panel pivoting around the second shaft reaches said position parallel to the base. This first activation lever is kinematically linked to a first pusher arranged for moving said first closing element from the open position to beyond said intermediate neutral position when the first activation lever is pushed to said activation position, such that the closing element suddenly moves from the intermediate neutral position to the closed position pushed by the elastic element.

Similarly, a second activation lever is positioned such that it is pushed from a stand-by position to an activation position by an element attached to the base or to the solar panel when the solar panel pivoting around the first shaft reaches said position parallel to the base, said second activation lever being kinematically linked to a second pusher arranged for moving said second closing element from the open position to beyond said intermediate neutral position when the second activation lever is pushed to said activation position.

Preferably, the first and second activation levers are associated with the first and second half-bearings such that they interfere in the passage along the corresponding notches when they are located in the stand-by position and are pushed by the respective first and second journals when they are received in the corresponding first and second half-bearings.

According to another alternative embodiment, the automatic connection/disconnection device comprises a first locking member movable between a locked position, in which the first locking member locks the first closing element in said closed position, and an unlocked position, in which the first locking member allows the first closing element to move between said closed and open positions, and a second locking member movable between a locked position, in which the second locking member locks the second closing element in said closed position, and an unlocked position, in which the second locking member allows the second closing element to move between said closed and open positions. In this embodiment, the linking member kinematically links said first and second locking elements to one another such that when the first locking element is moved to said locked position the second locking element is moved to said unlocked position, and vice versa.

In this embodiment, the automatic connection/disconnection device further comprises at least one elastic element installed in a flip-flop arrangement whereby said elastic element pushes one of the first and second locking elements towards the locked position and towards the unlocked position from an intermediate neutral position. A single elastic element is sufficient in accordance with the kinematic link provided by the linking member, although alternatively the automatic connection/disconnection device can include a first elastic element installed in a flip-flop arrangement and associated with the first locking element and a second elastic element installed in a flip-flop arrangement and associated with the second locking element for pushing them towards the locked position and towards the unlocked position from an intermediate neutral position.

In this embodiment, the automatic connection/disconnection device further comprises a first activation lever positioned such that it is pushed from a stand-by position to an activation position by an element attached to the base or to the solar panel when the solar panel pivoting around the second shaft reaches said position parallel to the base. This first activation lever is kinematically linked to a first pusher arranged for moving said first locking element from the unlocked position to beyond said intermediate neutral position when the first activation lever is pushed to said activation position. Therefore, the first locking element is suddenly moved to the locked position by the elastic element.

Similarly, a second activation lever is positioned such that it is pushed from a stand-by position to an activation position by an element attached to the base or to the solar panel when the solar panel pivoting around the first shaft reaches said position parallel to the base, said second activation lever being kinematically linked to a second pusher arranged for moving said second locking element from the unlocked position to beyond said intermediate neutral position when the second activation lever is pushed to said activation position.

When the first closing element is unlocked, the first journal interferes with the closing element and returns it to the open position during an initial phase of the pivoting movement of the solar panel around the second shaft from the position parallel to the base, and when the second closing element is unlocked, the second journal interferes with the closing element and returns it to the open position during an initial phase of the pivoting movement of the solar panel around the first shaft from the position parallel to the base.

Preferably, in this embodiment the first and second activation levers are positioned at the entrance of the corresponding first and second half-bearings such that they are pushed from the stand-by position to the activation position by the respective first and second journals when they are received in the corresponding half-bearings. Also preferably, the first activation lever and the first closing element are formed in a single part and the second activation lever and the second closing element are formed in a single part.

In another alternative embodiment, said automatic connection/disconnection device comprises a first connection/disconnection mechanism connecting/disconnecting the first end of the solar panel to/from the base, a second connection/disconnection mechanism connecting/disconnecting the second end of the solar panel to/from the base, at least one connection/disconnection actuator cooperating with said first and second connection/disconnection mechanisms, and electronic control means configured for controlling the operation of said at least one connection/disconnection actuator in cooperation with detection means arranged for detecting at least the position of the solar panel parallel to the base to operate the solar tracker according to a tracking mode in which the second connection/disconnection mechanism connects the second end of the solar panel to the base while at the same time said first connection/disconnection mechanism disconnects the first end of the solar panel from the base, and vice versa, when the solar panel reaches the position parallel to the base.

The mentioned electronic control means can be configured to operate the solar tracker further according to a secure storage mode in which the first and second connection/disconnection mechanisms connect the first and second ends of the solar panel to the base at the same time when the solar panel is in the position parallel to the base.

Thus, when the solar tracker is installed with its base in a fixed stationary position, for example on a fixed structure such as a building rooftop or on the roof of a parked vehicle, the present improvements allow providing the following solar tracker operation:

a) At night the solar tracker remains in a rest position with the solar panel parallel to the base. Preferably, in this position the two ends of the solar panel are connected to the base with both rotation shafts retained in their anchoring points according to the secure storage mode.

b) At dawn, the connection/disconnection mechanism corresponding to the west side is activated to release the connection of the end of the solar panel located in the west side with the base and the lifting mechanism is driven to raise the solar panel which rotates around the shaft located in the east side for orienting the solar panel towards the east in a maximum lift position according to the tracking mode.

c) Throughout the entire morning, the tracker gradually moves from said maximum lift position oriented towards the east to the position parallel to the base which is reached by mid-day.

d) From the position parallel to the base corresponding to mid-day, and following the relative movement of the sun, the connection/disconnection mechanism corresponding to the east side is activated to release the connection of the end of the solar panel located in the east side with the base and at the same time the connection/disconnection mechanism corresponding to the west side is activated to establish the connection of the end of the solar panel located in the west side with the base again. The lifting mechanism is then driven for raising the solar panel which now rotates around the shaft located in the west side for orienting the solar panel towards the west until reaching a maximum lift position at the end of the evening according to the tracking mode.

e) After sunset, the mechanisms of the solar tracker are driven to return the solar panel to the position parallel to the base and to again connect the two ends of the solar panel to the base for the night, according to the secure storage mode.

Preferably, the connection/disconnection mechanisms are configured such that the first or second connection/disconnection actuator for opening the connection between the corresponding end of the solar panel and the base is activated only for the time necessary to allow the release of the corresponding shaft.

When strong wind, for example in the case of a storm, is forecasted, or when the solar tracker is installed on a moving structure, for example on the roof of a moving vehicle, the mechanisms of the solar tracker are driven to arrange the solar panel at the position parallel to the base and to connect the two ends of the solar panel to the base according to the secure storage mode.

This embodiment with one or more connection/disconnection actuators provides the following advantages:

Better movement flexibility since it allows, for example, rotating the solar panel again around the same shaft used for reaching the position parallel to the base when the solar panel is in the position parallel to the base; and Possibility of anchoring both ends of the solar panel to the base at the same time. This is useful to increase the resistance against the effects produced by wind when the solar panel is in the position parallel to the base, for example in the event of a storm or when the solar tracker is fixed on the roof of a moving vehicle.

The electronic control means can be programmable and can include a user interface whereby a user can establish a program, select an operating mode, etc.

Preferably, each of the first and second shafts is defined by at least one journal fixed to the base and at least one corresponding half-bearing fixed to the solar panel, or vice versa, wherein the half-bearing is configured and arranged for receiving the corresponding journal in a radial direction when the solar panel reaches the position parallel to the base. Also preferably, each of the first and second connection/disconnection mechanisms comprises at least one closing element movable between a closed position, in which said the closing element retains the journal coupled to the half-bearing, and an open position, in which the closing element allows coupling and decoupling the journal to/from the half-bearing.

In one embodiment, each of the first and second connection/disconnection mechanisms comprises a locking member movable between a locked position, in which said locking member locks the closing element in said closed position, and an unlocked position, in which the locking member allows the closing element to move between said closed and open positions. For example, an elastic element pushes the locking member towards its locked position and a corresponding connection/disconnection actuator is arranged for pushing the locking member towards its unlocked position against the force of said elastic element. Furthermore, each of the closing elements is arranged for moving a cam which keeps the corresponding locking member in its unlocked position while the closing element is in its open position.

Each of the first and second connection/disconnection mechanisms further comprises an activation lever positioned such that it is pushed from a stand-by position to an activation position by an element attached to the base or to the solar panel when the solar panel pivoting around the opposite shaft reaches said position parallel to the base, and said activation lever is arranged for moving the corresponding closing element from its open position to its closed position when the activation lever is moved to its activation position. Likewise, an element attached to the base or to the solar panel moves the closing element from its closed position to its open position when the solar panel starts to pivot around the shaft corresponding to the opposite end from the position parallel to the base and while the locking member is kept in its unlocked position by the corresponding connection/disconnection actuator.

Although it is not essential, each closing element, its corresponding activation lever and its corresponding cam integrally rotate around a closing shaft, and the corresponding locking member rotates around a locking shaft parallel to said closing shaft. Each cam comprises a first interlocking element in which the locking member is interlocked in its locked position.

In another embodiment, the first connection/disconnection mechanism has a first connection/disconnection actuator operatively connected for moving the first closing element between its open position and its closed position, and the second connection/disconnection mechanism has a second connection/disconnection actuator operatively connected for moving the second closing element between its open position and its closed position.

In yet another embodiment, each of the first and second closing elements is movable between an open position, a first closed position, and a second closed position. Furthermore, the first and second connection/disconnection mechanisms are kinematically linked to one another by a linking member such that they are moved together by a single connection/disconnection actuator between a first position, in which the first closing element is in its first closed position and the second closing element is in its open position, a second position, in which the first closing element is in its open position and the second closing element is in its first closed position, and a third position, in which both first and second closing elements are in their respective second closed positions.

In any of the embodiments, the first connection/disconnection actuator, the second connection/disconnection actuator or the only connection/disconnection actuator can be, for example, an electric motor, an electromagnetic actuator, a hydraulic actuator or a pneumatic actuator.

In a preferred embodiment, the solar panel comprises a support structure supporting at least one photovoltaic panel, and the aforementioned first and second half-bearings together with the automatic connection/disconnection device are fixed to said support structure of the solar panel, whereas said first and second journals are fixed to the base.

In one embodiment, the lifting mechanism comprises at least first and second movable arms having upper ends connected to the solar panel by a first articulation. The first movable arm has a lower end connected by a second articulation to a nut coupled to a first threaded region of a screw supported in the base and the second movable arm has a lower end connected by a third articulation to a second nut coupled to a second threaded region of the screw. Said first and second threaded portions of the screw have opposite thread directions, and the screw is rotatably driven by the aforementioned lifting/lowering actuator, which can be, for example, an electronically controlled electric motor.

Preferably, the rotation axis of the screw is arranged in a direction perpendicular to the first and second shafts, and the screw, said first and second nuts and the lifting/lowering actuator are installed such that the assembly moves freely with respect to the base along a guide oriented in a direction parallel to said rotation axis of the screw.

BRIEF DESCRIPTION OF THE DRAWINGS

The foregoing and other features and advantages will be better understood from the following detailed description of several embodiments with reference to the attached drawings, in which.

DETAILED DESCRIPTION OF SEVERAL EMBODIMENTS

Figure 1:
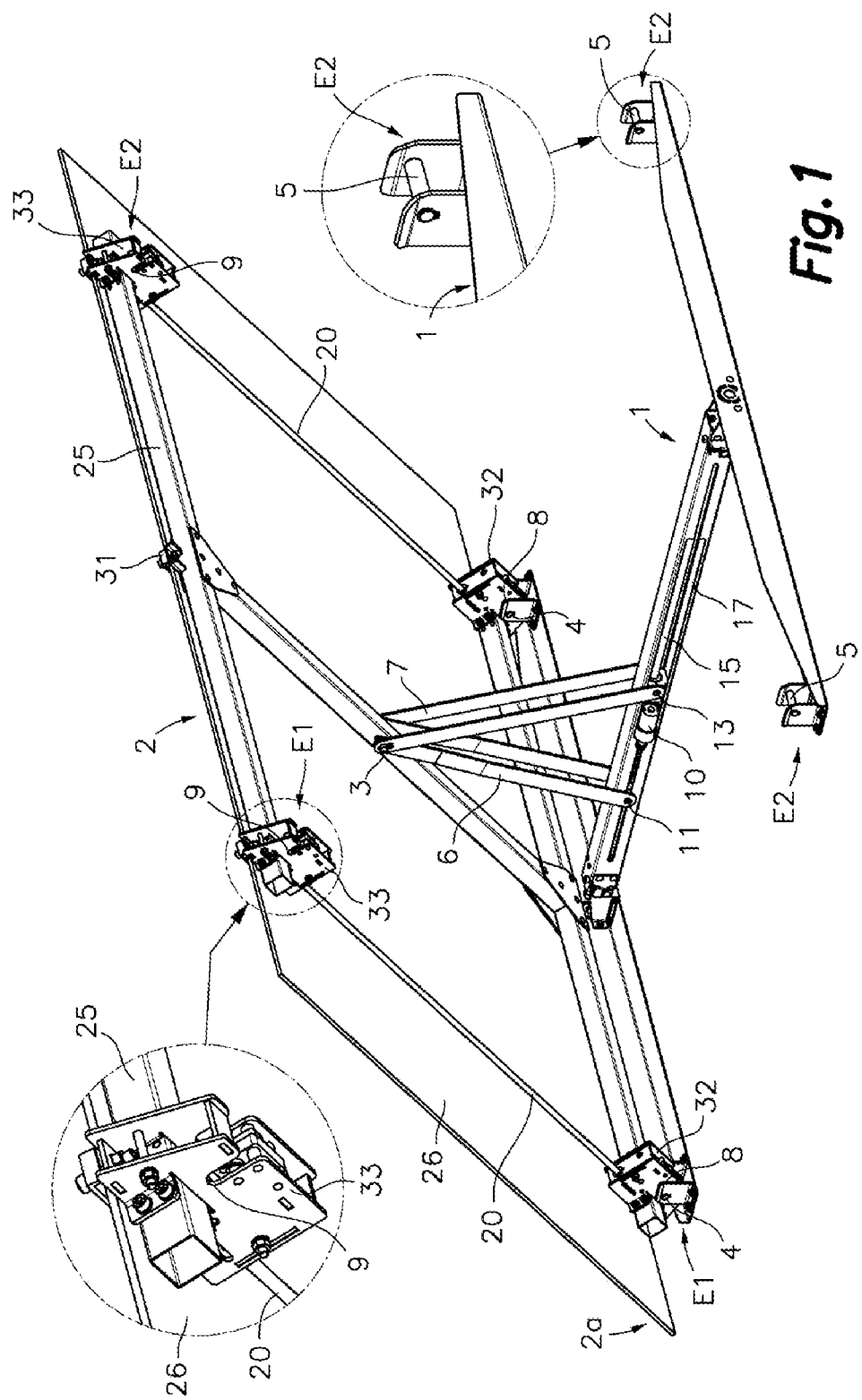
FIG. 1 is a perspective view of a solar tracker according to a first embodiment of the present invention, with two enlarged details.
Figure 2:
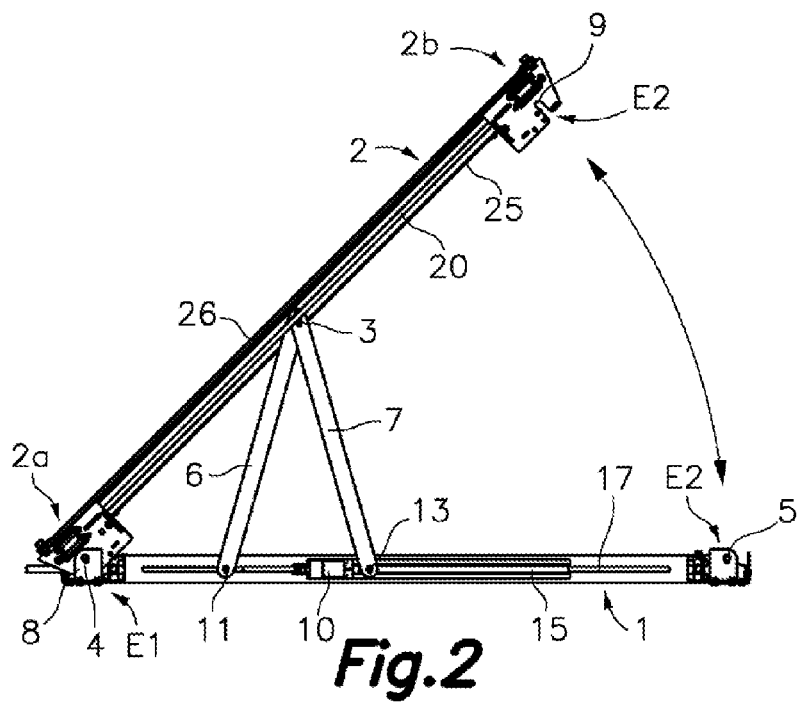
FIG. 2 is a side elevational view of the solar tracker in an eastern-oriented position corresponding to the morning.
Figure 3:
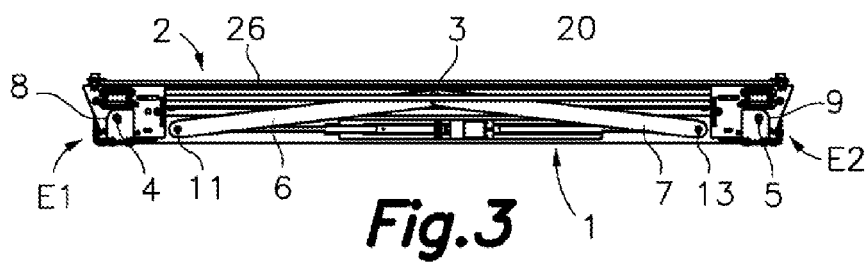
FIG. 3 is a side elevational view of the solar tracker in a horizontal position corresponding to mid-day.
Figure 4:
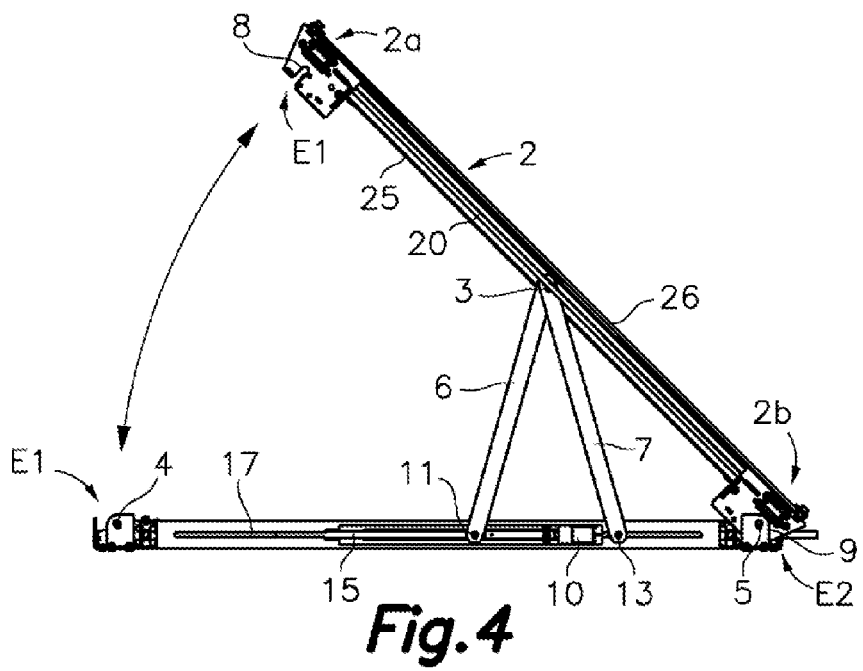
FIG. 4 is a side elevational view of the solar tracker in a western-oriented position corresponding to the evening.

First in reference to FIGS. 1 to 4, such figures show a solar tracker according to a first embodiment of the present invention, comprising a base 1 formed by connected metal sections forming an "H" shape and a solar panel 2 made up of a support structure 25 formed by connected metal sections forming an "H" shape supporting a photovoltaic panel 26. The photovoltaic panel 26 is secured to the support structure 25 by clamps 31 best shown in the enlarged details of FIGS. 6 and 7. The solar panel 2 has first and second opposite ends 2a, 2b. The first end 2a can be connected to the base 1 by a first shaft E1 and the second end 2b can be connected to the base 1 by a second shaft E2, such that the solar panel 2 can pivot with respect to the base 1 around said first shaft E1 when the first end 2a is connected to the base 1 and the second end 2b is disconnected from the base 1 (FIG. 2) and the solar panel 2 can pivot with respect to the base 1 around said second shaft E2 when the second end 2b is connected to the base 1 and the first end 2a is disconnected from the base 1 (FIG. 4).

The solar tracker includes a lifting mechanism installed in the base 1 and connected to the solar panel 2 in an intermediate region between said first and second ends 2a, 2b. This lifting mechanism is driven by a lifting/lowering actuator 10 for pivoting the solar panel 2 between a raised position (FIGS. 2 and 4) and a position parallel to the base 1 (FIG. 3) according to the relative movements of the sun.

There is installed in the solar panel 2 an automatic connection/disconnection device connecting the second end 2b of the solar panel 2 to the base 1 while at the same time disconnecting the first end 2a of the solar panel 2 from the base 1, and vice versa, every time the solar panel 2 reaches said position parallel to the base 1 for inverting the inclination of the solar panel 2 with respect to the base 1 when the lifting mechanism is driven for again moving the solar panel 2 from the position parallel to the base 1 towards said raised position.

The first shaft E1 is defined by a pair of first coaxial journals 4 fixed to two corners of a first end of the base 1 and a pair of corresponding first coaxial half-bearings 8 fixed to two corners of the first end 2a of the solar panel 2, and the second shaft E2 is defined by a pair of second coaxial journals 5 fixed to two corners of a second end of the base 1 and a pair of corresponding second coaxial half-bearings 9 fixed to two corners of the second end 2b of the solar panel 2. The first and second half-bearings 8, 9 are formed by the rounded ends of notches formed in corresponding first and second casings 32, 33 of the automatic connection/disconnection device fixed to the solar panel 2, and are configured and arranged for receiving the respective first and second journals 4, 5 inserted in a radial direction in said notches when the solar panel 2 reaches said position parallel to the base 1.

A person skilled in the art will understand that although in the embodiments shown and described the first and second journals 4, 5 are fixed to the base 1 and the first and second half-bearings 8, 9 together with the automatic connection/ disconnection device are fixed to the solar panel 2, a reverse construction (not shown) in which the first and second journals 4, 5 are fixed to the solar panel 2 and the first and second half-bearings 8, 9 together with the automatic connection/ disconnection device are fixed to the base 1 is within the scope of the present invention. An embodiment with only a first journal, a first half-bearing, a second journal and a second half-bearing is also within the scope of the present invention. First and second embodiments of the connection/disconnection device in relation to FIGS. 6-7 and 8-12, respectively, will be described below in detail.

Figure 5:
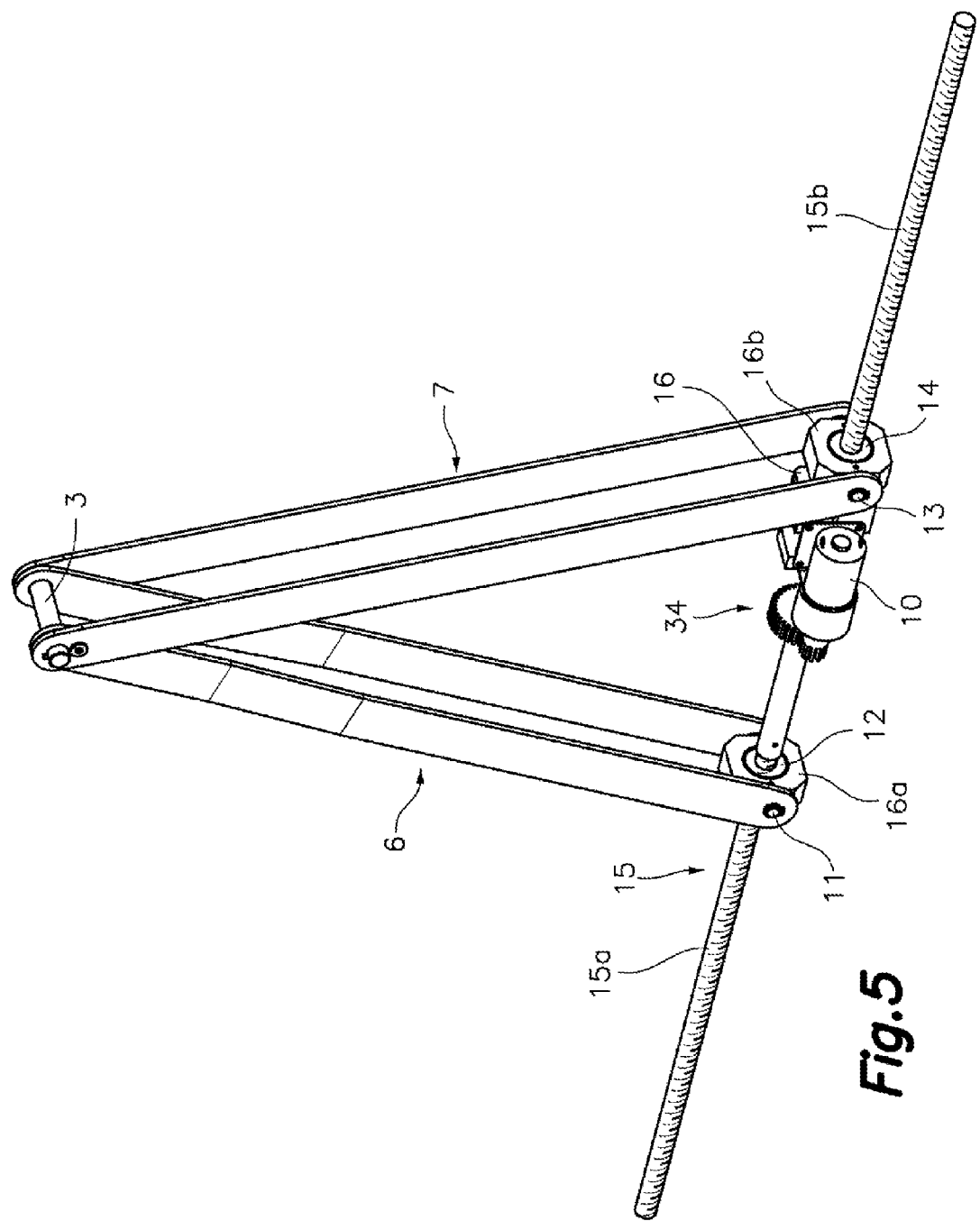
FIG. 5 is a perspective view of a lifting mechanism of the solar tracker of FIG. 1.

FIG. 5 shows the aforementioned lifting mechanism used for varying the inclination of the solar panel 2 with respect to the base 1. The lifting mechanism comprises first and second movable arms 6, 7 having an upper end connected to a middle region of the support structure 25 of the solar panel 2 by a first articulation 3 (see also FIGS. 1 to 4). The first arm 6 has a lower end connected by a second articulation 11 to a first movable support 16a in which a first nut 12 is fixed and the second movable arm 7 has a lower end connected by a third articulation 13 to a second movable support 16b in which a second nut 14 is fixed.

These first and second nuts 12, 14 are coupled respectively to first and second threaded regions 15a, 15b of a screw 15 supported in the base 1 and rotatably driven by the aforementioned lifting/lowering actuator 10. Said first and second threaded portions 15a, 15b of the screw 15 have opposite thread directions, such that when the screw is turned in one direction the first and second nuts 12, 14 move closer to one another and the first articulation 3 is raised for moving the solar panel 2 towards the raised position, and when it is turned in the direction opposite the first and second nuts 12, 14 move away from one another and the first articulation 3 moves downwards for moving the solar panel 2 towards the position parallel to the base.

The lifting/lowering actuator 10, which in the example shown is an electronically controlled electric motor, is installed on a movable support 16 provided with an opening through which the screw 15 is inserted and operatively connected for driving the screw by means of a gear transmission 34. In the embodiment shown, the first articulation 3 is parallel to the first and second shafts E1, E2, the screw 15 has a rotation axis arranged in a direction perpendicular to the first and second shafts E1, E2, and the movable supports 16, 16a, 16b supporting the screw 15, the first and second nuts 14 and the lifting/lowering actuator 10 are installed such that they can move freely with respect to the base 1 along a guide 17 (FIGS. 1 to 4) oriented in a direction parallel to said rotation axis of the screw 15.

Nevertheless, an alternative embodiment (not shown) in which the rotation axis of the screw 15 is arranged in a direction parallel to the first and second shafts E1, E2 is within the scope of the present invention, and even an alternative embodiment (not shown) provided with a single movable arm with an upper end connected to the solar panel and a lower end connected to a single nut coupled to a screw provided with a single threaded portion can be conceived. Any lifting mechanism based on a mechanical arrangement different from that shown and described in relation to FIG. 5 is also within the scope of the present invention provided that it is capable of pivoting the solar panel 2 around the first and second shafts E1, E2 between the raised position and the position parallel to the base under the drive of a lifting/ lowering actuator 10.

It is also within the scope of the present invention another alternative embodiment (not shown) whit an inverse construction, wherein the screw 15 is supported on the solar panel 2 and the movable arm has a lower end connected to a middle region of the base 1 by a first articulation and an upper end articulately connected to a nut coupled to a threaded portion of the screw 15, in the case of incorporating a single movable arm, or preferable the first and second movable arms 6, 7 have lower ends connected to a middle region of the base 1 by a first articulation and respective upper ends articulately connected to a nut or to first and second nuts respectively coupled to first and second threaded portions 15a, 15b of the screw 15, said first and second threaded portions 15a, 15b having inverse thread directions, in the case of incorporating two movable arms.

Figure 6:
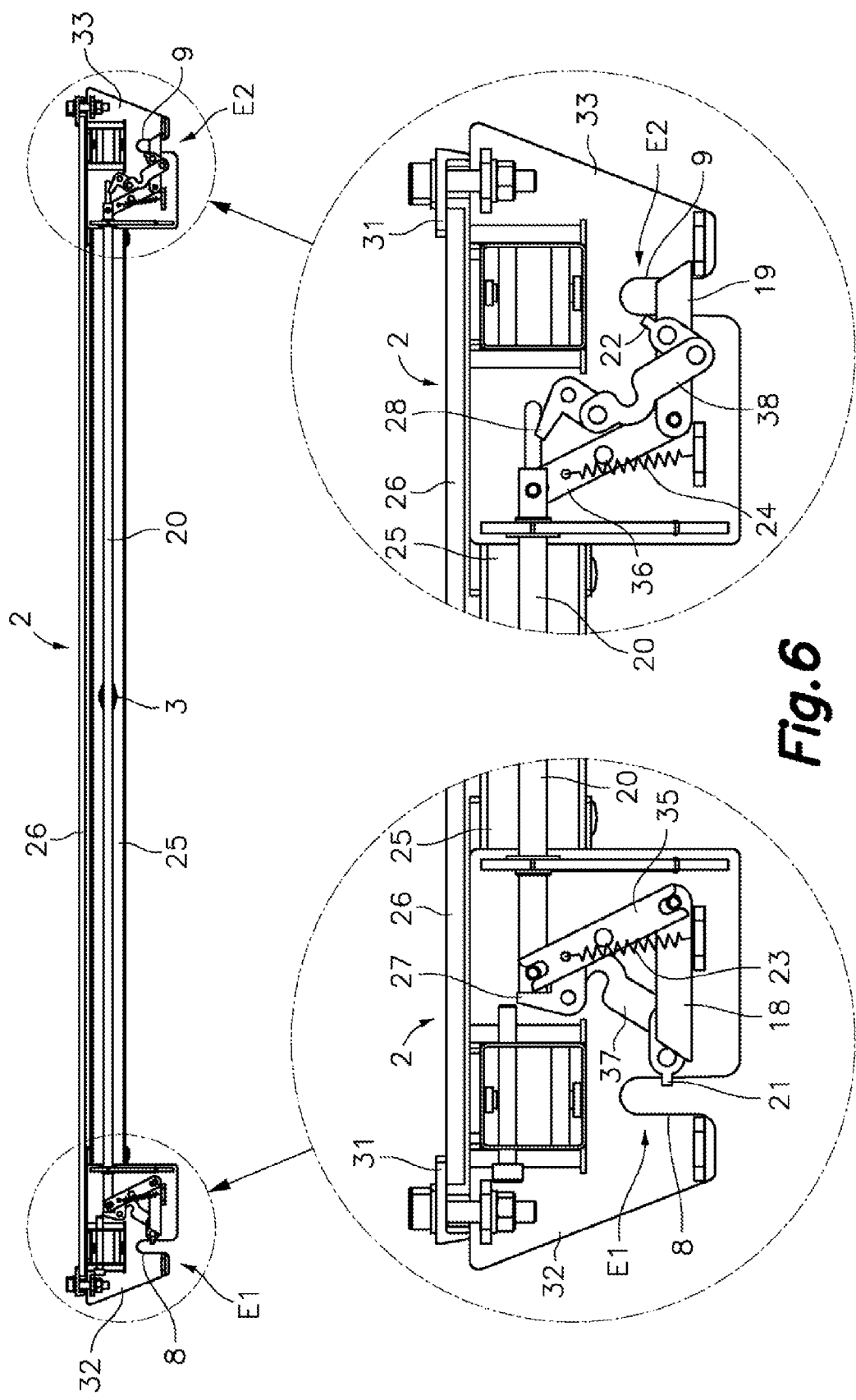
FIG. 6 is a side elevational view with two enlarged details of an automatic connection/disconnection device of the solar tracker of FIG. 1 when the solar tracker is located in the eastern-oriented position shown in FIG. 2.
Figure 7:
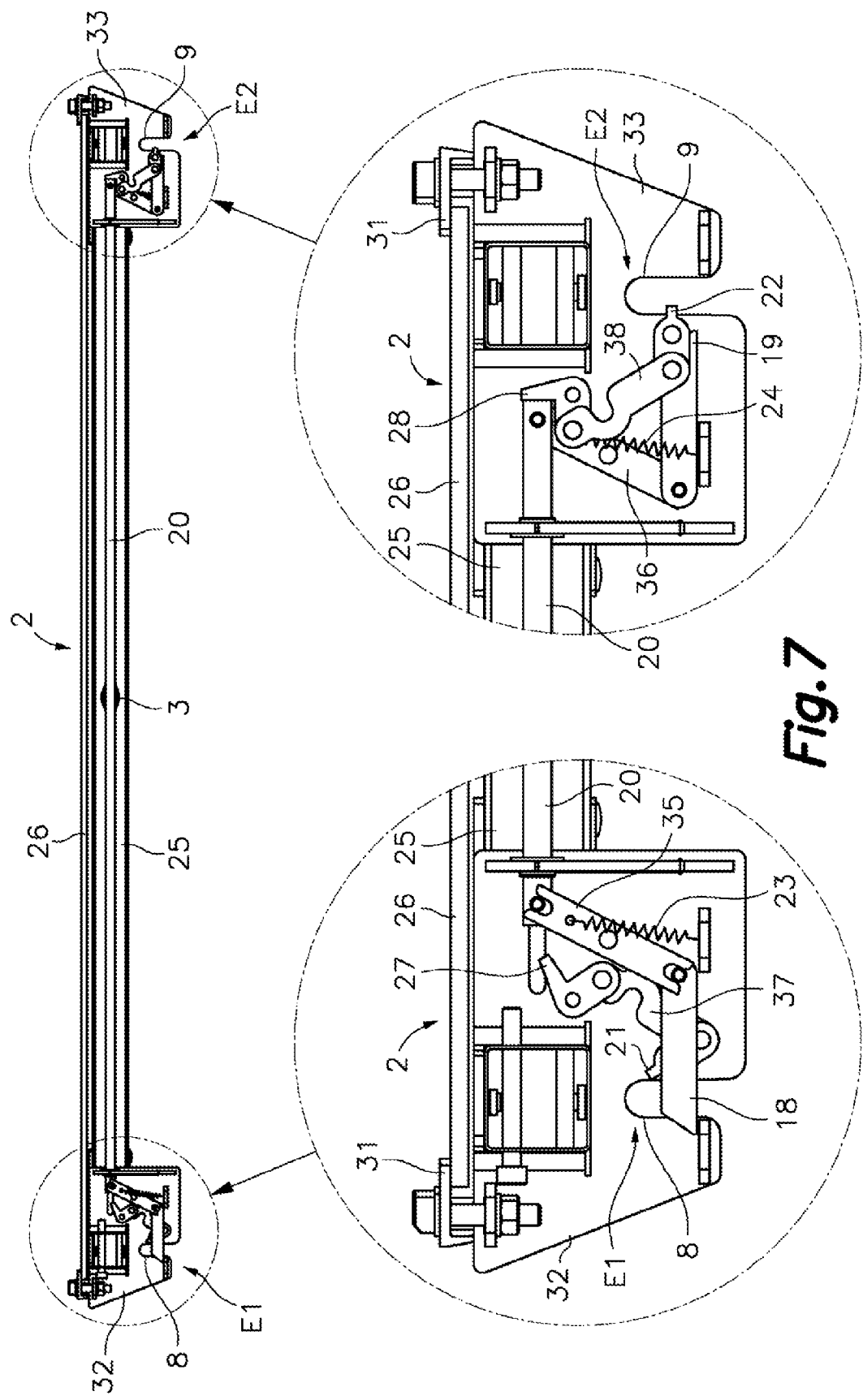
FIG. 7 is a side elevational view with two enlarged details of the automatic connection/disconnection device of FIG. 6 when the solar tracker is located in the western-oriented position shown in FIG. 4.

FIGS. 6 and 7 show a first embodiment of the automatic connection/disconnection device, comprising first and second closing elements 18, 19 associated with the first and second first half-bearings 8, 9, respectively. Each of the aforementioned first closing elements 18 is installed in one of the first casings 32 such that it can move relative to the corresponding first half-bearing 8 between a closed position (shown on the left in FIG. 7), in which said first closing element 18 closes the passage through the corresponding notch for retaining the first journal 4 coupled to the first half-bearing 8, and an open position (shown on the left in FIG. 6), in which the first closing element 18 allows the first journal 4 to slide along the notch for being coupled and decoupled to/from the first half-bearing 8.

Similarly, each of the second closing elements 19 is installed in one of the second casings 33 such that it can move relative to the corresponding second half-bearing 9 between a closed position (shown on the right in FIG. 6), in which the second closing element 19 closes the passage through the corresponding notch for retaining the second journal 5 coupled to the second half-bearing 9, and an open position (shown on the right in FIG. 7), in which the second closing element 19 allows the second journal 5 to slide along the notch for being coupled and decoupled to/from the second half-bearing 9.

The first and second closing elements 18, 19 are kinematically linked to one another by a linking member 20 such that when the first closing element 18 is moved to said open position the second closing element 19 is moved to said closed position, and vice versa. For that purpose, the aforementioned linking member 20 extends between the first and second casings 32, 33 and is assembled such that it can slide axially with respect thereto. The first closing element 18 is connected in an articulated manner to a first end of a first rocker 35 the second end of which is connected in an articulated manner to the linking member 20, and a first elastic element 23 connected to the first rocker 35 is installed in a flip-flop arrangement whereby said first elastic element 23 pushes the first closing element 18 towards the closed position and towards the open position from an intermediate neutral position.

Similarly, the second closing element 19 is connected in an articulated manner to a first end of a second rocker 36 the second end of which is connected in an articulated manner to the linking member 20, and a second elastic element 24 connected to the second rocker 36 is installed in a flip-flop arrangement whereby said second elastic element 24 pushes the second closing element 19 towards the closed position and towards the open position from an intermediate neutral position. It will be understood that in accordance with the kinematic link between the first and second closing elements 18, 19 provided by the linking member 20 and the first and second rockers 35, 36, a single elastic element connected to any element of the kinematic chain and installed in a flip-flop arrangement would be sufficient.

The automatic connection/disconnection device further comprises a first activation lever 21 positioned in the first casing 32 at the entrance of the notch defining the first half-bearing 8 such that it is movable between a stand-by position (shown on the left in FIG. 6), in which the first activation lever 21 interferes with the passage along the corresponding notch, and an activation position (shown on the left in FIG. 7), in which the first activation lever 21 is withdrawn from the notch. This first activation lever 21 is pushed from the stand-by position to the activation position by the first journal 4 when the solar panel 2, after a downward pivoting movement around the second shaft E2, reaches said position parallel to the base 1 and the first journal 4 is inserted in the corresponding notch for being coupled with the first half-bearing 8.

Similarly, a second activation lever 22 is positioned in the second casing 33 at the entrance of the notch defining the second half-bearing 9 such that it is movable between a stand-by position (shown on the right in FIG. 7), in which the second activation lever 22 interferes with the passage along the corresponding notch, and an activation position (shown on the right in FIG. 6), in which the second activation lever 22 is withdrawn from the notch. This second activation lever 22 is pushed from the stand-by position to the activation position by the second journal 5 when the solar panel 2, after a downward pivoting movement around the first shaft E1, reaches the position parallel to the base 1 and the second journal 5 is inserted in the corresponding notch for being coupled with the second half-bearing 9.

The first activation lever 21 is kinematically linked by a first connecting rod 37 to a first pusher 27 arranged relative to one end of the linking member 20 such that when the first activation lever 21 is moved by the first journal 4 from its stand-by position to its activation position the first pusher 27 pushes the linking member 20 and the latter in turn by means of the first rocker 35 moves the first closing element 18 from the open position to beyond said intermediate neutral position, from which the first elastic element 23 ends up suddenly moving the first closing element 18 to the closed position, whereby the first closing element 18 traps the first journal 4 in coupling with the first half-bearing 8 for defining the first shaft E1. At the same time, and in accordance with the kinematic link provided by the linking member 20 and the first and second rockers 35, 36, the second closing element 19 is moved to its open position, whereby the second closing element 19 releases the second journal 5 so that it can be decoupled from the second half-bearing 9.

Similarly, the second activation lever 22 is kinematically linked by a second connecting rod 38 to a second pusher 28 arranged relative to the other end of the linking member 20 such that when the second activation lever 22 is moved by the second journal 5 from its stand-by position to its activation position the second pusher 28 pushes the linking member 20 and the latter in turn by means of the second rocker 36 moves the second closing element 19 from the open position to beyond said intermediate neutral position, from which the second elastic element 24 ends up suddenly moving the second closing element 19 to the closed position, whereby the second closing element 19 traps the second journal 5 in coupling with the second half-bearing 9 for defining the second shaft E2. At the same time, and in accordance with the kinematic link provided by the linking member 20 and the first and second rockers 35, 36, the first closing element 18 is moved to its open position, whereby the first closing element 18 releases the first journal 4 so that it can be decoupled from the first half-bearing 8.

FIGS. 8 to 12 show a second alternative embodiment of the automatic connection/disconnection device. Similarly to the first embodiment, the solar tracker comprises a base 1 and a solar panel 2 comprising, for example, a support structure supporting at least one photovoltaic panel. The first shaft E1 is defined by the coupling of a pair of first coaxial journals 4 fixed to the base 1 with a pair of corresponding first coaxial half-bearings 8 formed by notches of first casings 32 fixed to the solar panel 2, and a second shaft E2 is defined by the coupling of a pair of second coaxial journals 5 fixed to the base 1 with a pair of corresponding second half-coaxial bearings 9 formed in the ends of notches formed in second casings 33 fixed to the solar panel 2.

In each of the first casings 32 there is a first closing element 18 and a first activation lever 21 positioned relative to the notch defining the first half-bearing 8. The first closing element 18 and the first activation lever 21 are formed in a single part which is movable between a first position (shown on the left in FIG. 12), in which the first closing element 18 is in the open position and the first activation lever 21 is in the stand-by position, and a second position (not shown), in which the first closing element 18 is in the closed position and the first activation lever 21 is in the activation position. The first activation lever 21 is pushed by the first journal 4 from the stand-by position to the activation position when the first journal 4 is inserted in the corresponding notch, whereby the first closing element 18 retains the first journal 4 coupled to the first half-bearing 8, and the first closing element 18 is pushed from the closed position to the open position by the first journal 4 when the latter comes out of the corresponding notch and is decoupled from the first half-bearing 8.

Similarly, in each of the second casings 32 there is a second closing element 19 and a second activation lever 22 positioned relative to the notch defining the second half-bearing 9. The second closing element 19 and the second activation lever 22 are formed in a single part which is movable between a first position (not shown), in which the first closing element 18 is in the open position and the first activation lever 21 is in the stand-by position, and a second position (shown on the right in FIG. 12), in which the first closing element 18 is in the closed position and the first activation lever 21 is in the activation position. The second activation lever 22 is pushed by the second journal 5 from the stand-by position to the activation position when the second journal 5 is inserted in the corresponding notch, whereby the second closing element 19 retains the second journal 5 coupled to the second half-bearing 9, and the second closing element 19 is pushed from the closed position to the open position by the second journal 5 when the latter comes out of the corresponding notch and is decoupled from the second half-bearing 9.

The automatic connection/disconnection device of this second embodiment further comprises a locking device configured for alternately locking the first and second closing elements 18, 19 in their respective closed positions, and for alternately unlocking the first and second closing elements 18, 19 and thereby allowing their movements between their respective closed and open positions.

Figure 8:
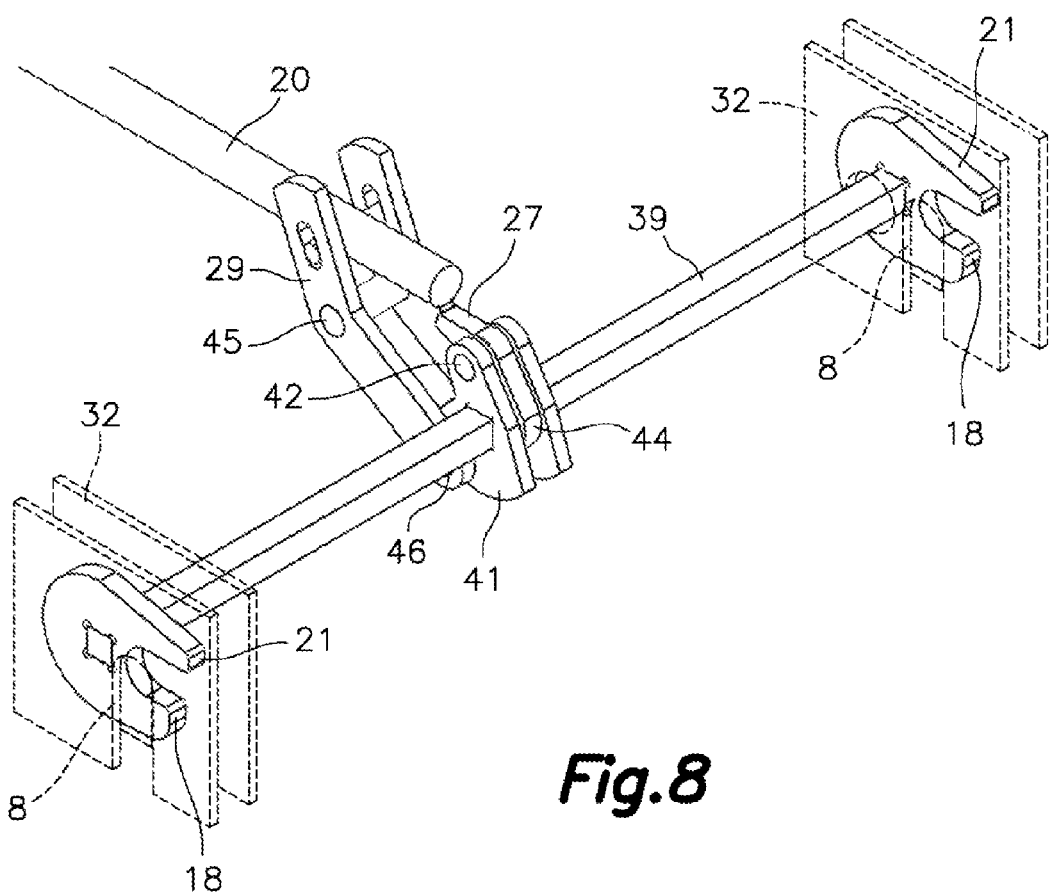
FIG. 8 is a schematic partial perspective view of an automatic connection/disconnection device of a solar tracker according to a second embodiment of the present invention.
Figure 9:
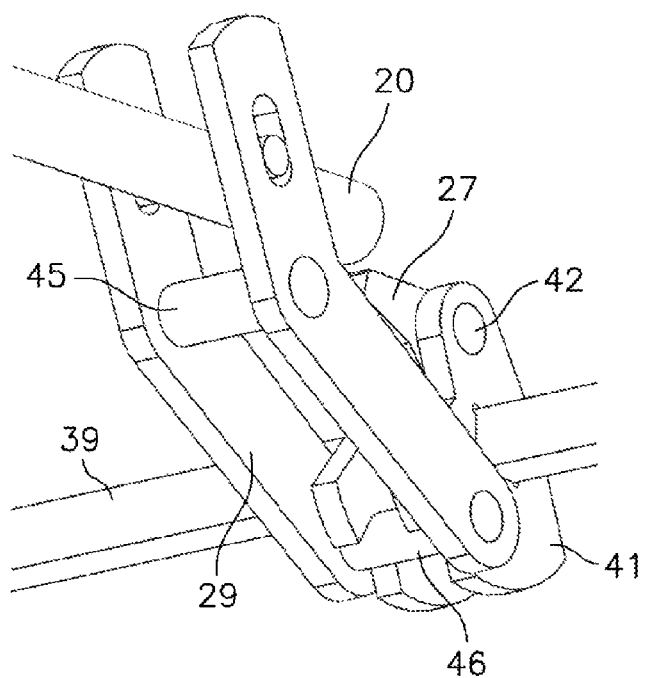
FIG. 9 is a partial perspective view illustrating a locking member of the automatic connection/disconnection device of FIG. 8.
Figure 10:
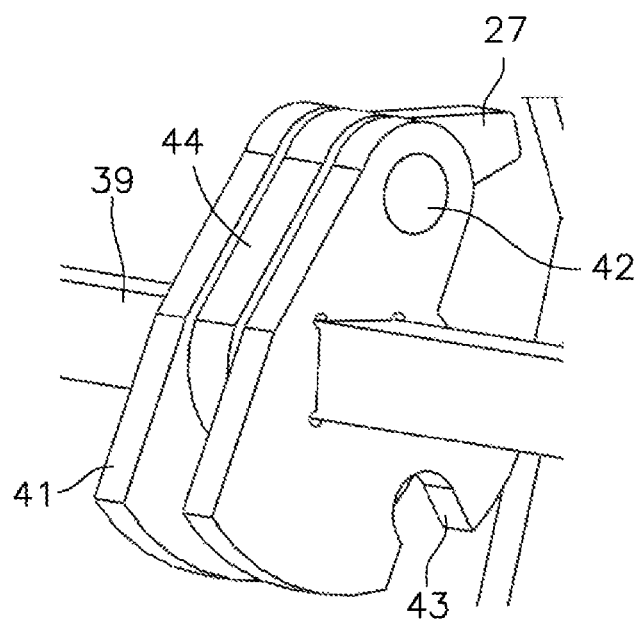
FIGS. 10 and 11 are partial perspective views illustrating a pusher of the automatic connection/disconnection device of FIG. 8.
Figure 11:
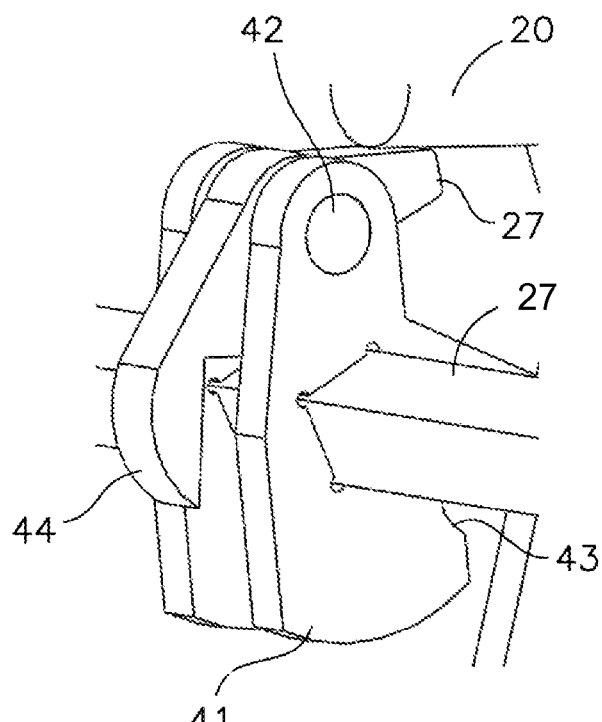

As shown in FIG. 8, the two parts defining the first closing element 18 and the first activation lever 21 in each of the two first casings 32 are connected to one another by a first square cross-section connecting rod 39. A first closing support 41 is fixed in a middle region of this first connecting rod 39, assembled such that it can pivot around a first closing shaft 42 supported in the solar panel 2. This first closing support 41 has a first locking notch 43 (best shown in FIG. 10). A first pusher 27 is associated with the first closing support 41, assembled such that it can pivot independently around said first closing shaft 42. This first pusher 27 has an appendage 44 configured for acting as a stop for the first connecting rod 39.

The first pusher 27 is positioned relative to an end of a single linking member 20 extending between first and second ends 2a, 2b of the solar panel 2 and assembled such that it can slide axially with respect thereto. In accordance with the stop between the appendage 44 and the first connecting rod 39, the first pusher 27 can be turned in a first direction by the first activation levers 21 for pushing the linking member 20, and it is turned in a second opposite direction by an elastic element (not shown) for recovering its initial position.

A first locking member 29, which is assembled such that it can pivot around a first locking shaft 45 supported in the solar panel 2, has an upper end connected in an articulated manner to a first end of the linking member 20 and a lower end provided with a first locking element 46. This first locking member 29 can pivot between a locked position (FIGS. 8 and 9), in which the first locking element 46 is inserted in the first locking notch 43 of the first closing support 41 for locking the first closing elements 18 in their closed positions, and an unlocked position (shown on the left in FIG. 12), in which it allows the first closing elements 18 to move between said closed and open positions.

A first elastic element 23 connected to the first locking member 29 is installed in a flip-flop arrangement, such that this first elastic element 23 pushes the first locking member 29 towards the locked position and towards the unlocked position from an intermediate neutral position.

Similarly, the two parts defining the second closing element 19 and the second activation lever 22 in each of the two second casings 33 are connected to one another by a second square cross-section connecting rod 40. A second closing support (not shown) is fixed in a middle region of this second connecting rod 40 assembled such that it can pivot around a second closing shaft 47 supported in the solar panel 2. This second closing support has a second locking notch 48 (shown by means of dotted lines in FIG. 12). A second pusher 28 is associated with the second closing support, assembled such that it can pivot independently around said second closing shaft 47. This second pusher 28 has an appendage 49 configured for acting as a stop for the second connecting rod 40.

The second pusher 28 is positioned relative to another opposite end of the linking member 20. In accordance with the stop between the appendage 49 and the second connecting rod 40, the second pusher 28 can be turned in a first direction by the second activation levers 22 for pushing the linking member 20, and it is turned in a second opposite direction by an elastic element (not shown) for recovering its initial position.

Figure 12:
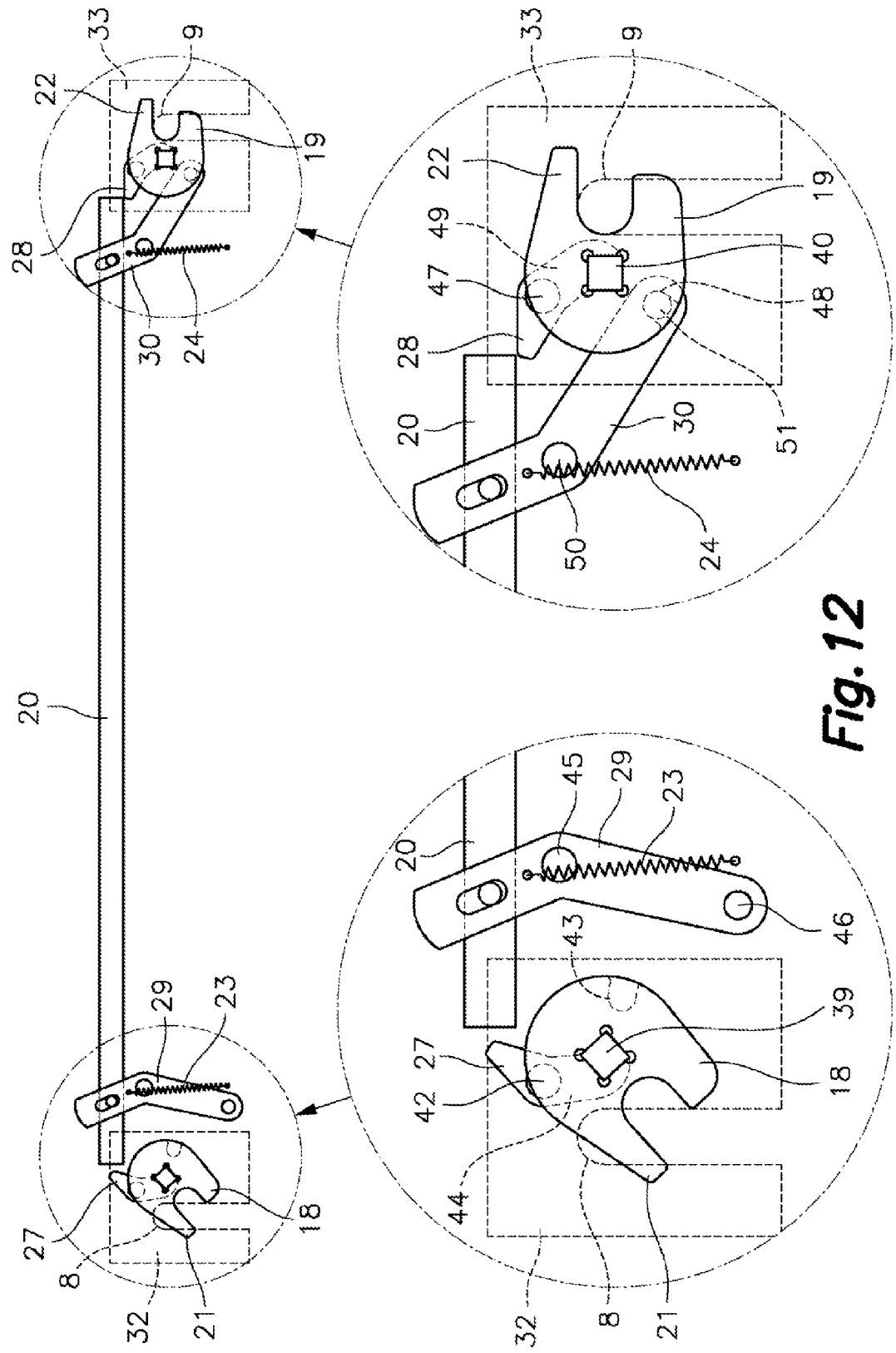
FIG. 12 is a side elevational view with two enlarged details of the automatic connection/disconnection device of FIG. 8 when the solar tracker is located in the western-oriented position shown in FIG. 4.

A second locking member 30, which is assembled such that it can pivot around a second locking shaft 50 supported in the solar panel 2, has an upper end connected in an articulated manner to a second end of the linking member 20 and a lower end provided with a second locking element 51 (shown by means of dotted lines in FIG. 12). This second locking member 30 can pivot between a locked position (shown on the right in FIG. 12), in which the second locking element 51 is inserted in the second locking notch 48 of the second closing support for locking the second closing elements 19 in their closed positions, and an unlocked position (not shown), in which it allows the second closing elements 18 to move between said closed and open positions.

A second elastic element 24 connected to the second locking member 30 is installed in a flip-flop arrangement, such that this second elastic element 24 pushes the second locking member 30 towards the locked position and towards the unlocked position from an intermediate neutral position.

It will be observed in this second embodiment of the automatic connection/disconnection device that the linking member 20 kinematically links the first and second locking elements 29, 30 to one another such that when the first locking member 29 is moved to its locked position the second locking member 30 is moved to its unlocked position, and vice versa. In accordance with this kinematic link, an alternative embodiment in which there is a single elastic element installed in a flip-flop arrangement and connected to any of the first and second locking elements 29, 30 or even to the linking member 20 for pushing the first and second locking elements 29, 30 towards their locked and unlocked positions from an intermediate neutral position is considered within the scope of the present invention.

A reverse construction of this second embodiment, where the first and second journals 4, 5 are fixed to the solar panel 2 and the first and second half-bearings 8, 9 together with the automatic connection/disconnection device are installed in the base 1, is also within the scope of present invention. A variant of this second embodiment where the first and second activation levers 21, 22 are not formed in the same part as their respective first and second closing elements 18, 19, but are separate parts kinematically linked to the respective first and second closing elements 18, 19 by one or more connecting elements is also within the scope of present invention.

Likewise, in any of the first and second embodiments, the first and second activation levers 21, 22 can be positioned alternatively such that they are pushed from their stand-by positions to their activation positions by any element attached to the base 1 different from the first and second journals 4, 5 (or any element attached to the solar panel 2 different from the first and second journals 4, 5 in the case of the aforementioned reverse construction) when the solar panel 2 pivoting around the first or second shaft E1, E2 reaches said position parallel to the base 1.

Figure 13:
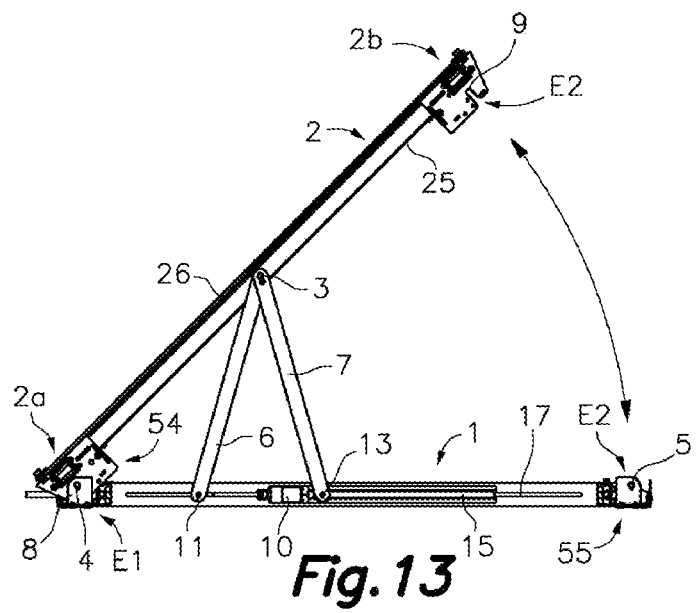
FIGS. 13 to 15 are side views of a solar tracker according to a third embodiment of the present improvements in an eastern-oriented position corresponding to the morning, a horizontal position corresponding to mid-day, and a western-oriented position corresponding to the evening, respectively, in a tracking mode.
Figure 14:
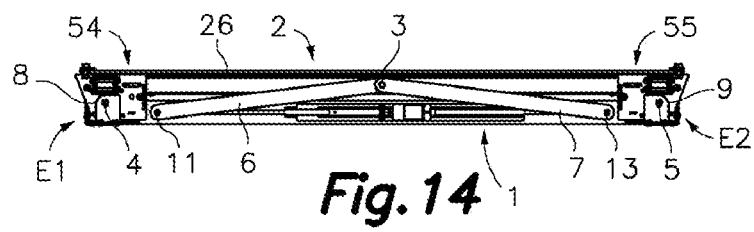
Figure 15:
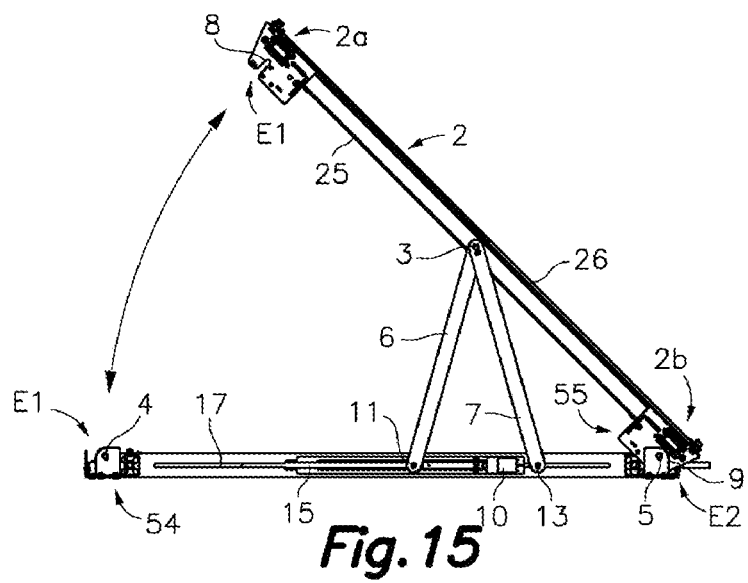

Now in reference to FIGS. 13 to 15, they show a third embodiment of the solar tracker comprising, similarly to that described above in relation to the first and second embodiments, a base 1 and a solar panel 2 made up of a support structure 25 and a photovoltaic panel 26. The solar panel 2 has first and second opposite ends 2a, 2b which can be connected to said base 1 by respective first and second mutually parallel shafts E1, E2, such that said solar panel 2 can pivot with respect to the base 1 around said first shaft E1 when the first end 2a is connected to the base 1 and the second end 2b is disconnected from the base 1, for example for adopting an eastern-oriented position (FIG. 13), and the solar panel 2 can pivot with respect to the base 1 around said second shaft E2 when the second end 2b is connected to the base 1 and the first end 2a is disconnected from the base 1, for example for adopting a western-oriented position (FIG. 15).

To go from the eastern-oriented position (FIG. 13) to the western-oriented position (FIG. 15), and vice versa, the solar panel goes through a horizontal position, or more specifically through a position parallel to the base (FIG. 14), in which both first and second ends 2a, 2b of the solar panel are adjacent to the base 1.

The solar tracker includes a lifting mechanism 6, 7, 11, 13, 15, 17 installed in the base 1 and connected to the solar panel 2 by an articulation 3 in an intermediate region between said first and second ends 2a, 2b. A lifting/lowering actuator 10 is operatively connected for moving said lifting mechanism and thereby pivoting said solar panel 2 around the first shaft E1 or the second shaft E2 between a position parallel to the base and a raised position according to the relative movements of the sun. The solar tracker further comprises an automatic connection/disconnection device connecting the first and second ends 2a, 2b of the solar panel 2 to the base 1, and vice versa, when the solar panel 2 reaches said position parallel to the base 1.

According to this third embodiment, the mentioned automatic connection/disconnection device comprises a first connection/disconnection mechanism 54 cooperating with a first connection/disconnection actuator 52 for connecting/disconnecting the first end 2a of the solar panel 2 to/from the base 1, a second connection/disconnection mechanism 55 cooperating with a second connection/disconnection actuator 53 for connecting/disconnecting the second end 2b of the solar panel 2 to/from the base 1, and electronic control means 60 configured for controlling the operation of said first and second connection/disconnection actuators 52, 53 in cooperation with detection means arranged for detecting at least the position of the solar panel 2 parallel to the base 1.

The first and second connection/disconnection mechanisms 54, 55 are mechanically independent and the mentioned electronic control means 60 are configured for providing a tracking mode and a secure storage mode. In the tracking mode, the second connection/disconnection mechanism 55 connects the second end 2b of the solar panel 2 to the base 1 while at the same time the first connection/disconnection mechanism 54 disconnects the first end 2a from the solar panel 2 of the base 1, and vice versa, for inverting the inclination of the solar panel 2 with respect to the base 1 when the solar panel 2 reaches the position parallel to the base 1.

In the secure storage mode, the first and second connection/disconnection mechanisms 54, 55 connect the first and second ends 2a, 2b of the solar panel 2 to the base 1 at the same time when the solar panel 2 is in the position parallel to the base 1, which provides greater resistance against the effects of the wind, for example in the event of a storm, or when the solar tracker is installed in the roof of a moving vehicle.

The first shaft E1 is defined by a pair of first coaxial journals 4 (only one of which is shown in the drawings) fixed to the base 1 and corresponding first half-bearings 8 (only one of which is shown in the drawings) fixed to the solar panel 2. Similarly, said second shaft E2 is defined by a pair of second journals 5 (only one of which is shown in the drawings) fixed to the base 1 and corresponding second half-bearings 9 (only one of which is shown in the drawings) fixed to the solar panel 2. Said first and second half-bearings 8, 9 are configured and arranged for receiving the corresponding first and second journals 4 in a radial direction when the solar panel 2 reaches the position parallel to the base 1.

A person skilled in the art will alternatively understand that a reverse construction is possible, in which the journals are fixed to the solar panel and the half-bearings are fixed to the base, with a similar result.

Figure 16:
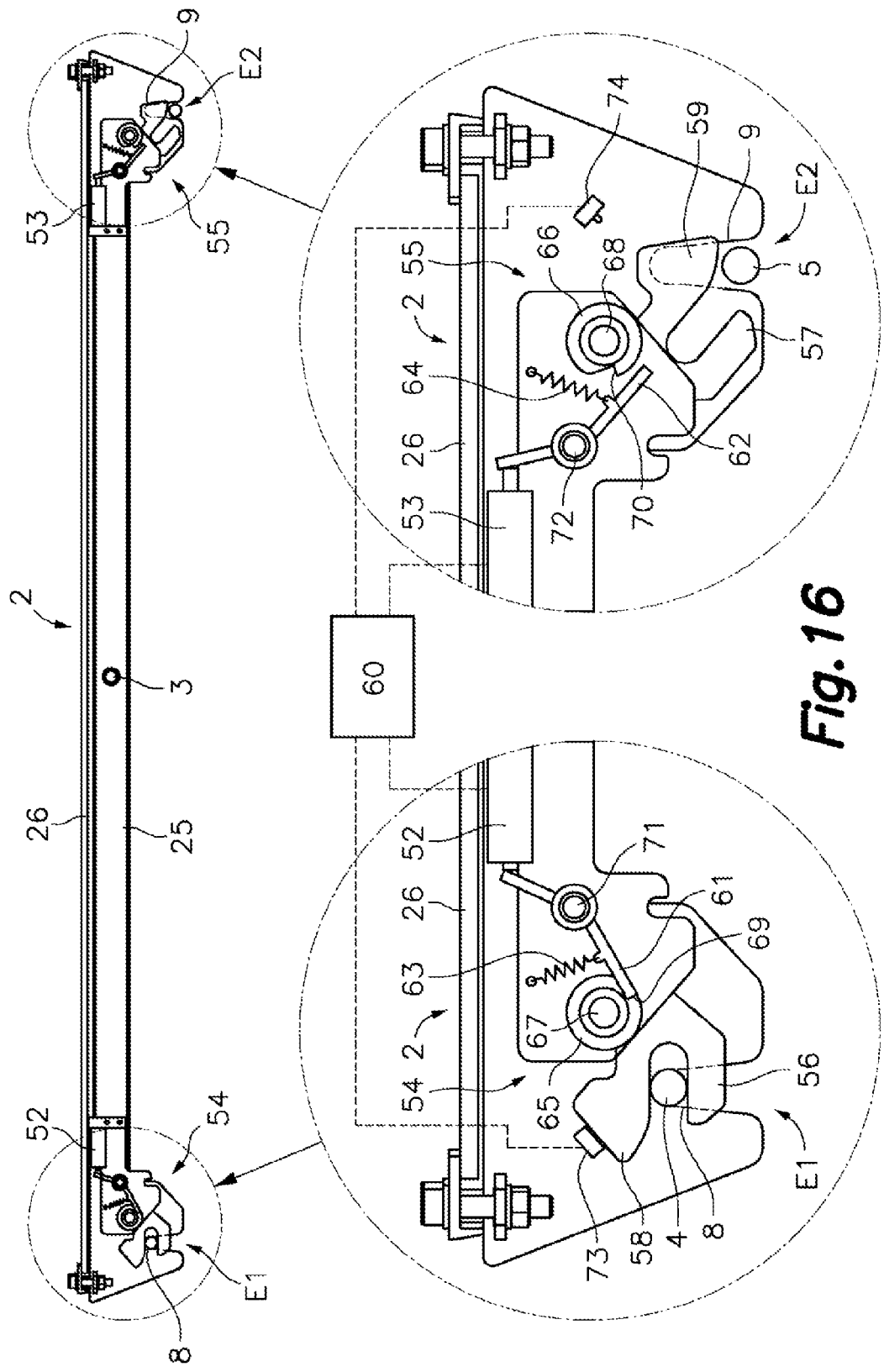
FIG. 16 is a side elevational view of a solar panel of the solar tracker of FIGS. 13 to 15 with two enlarged details showing the arrangement of connection/disconnection mechanisms when the solar tracker is in the eastern-oriented position.
Figure 17:
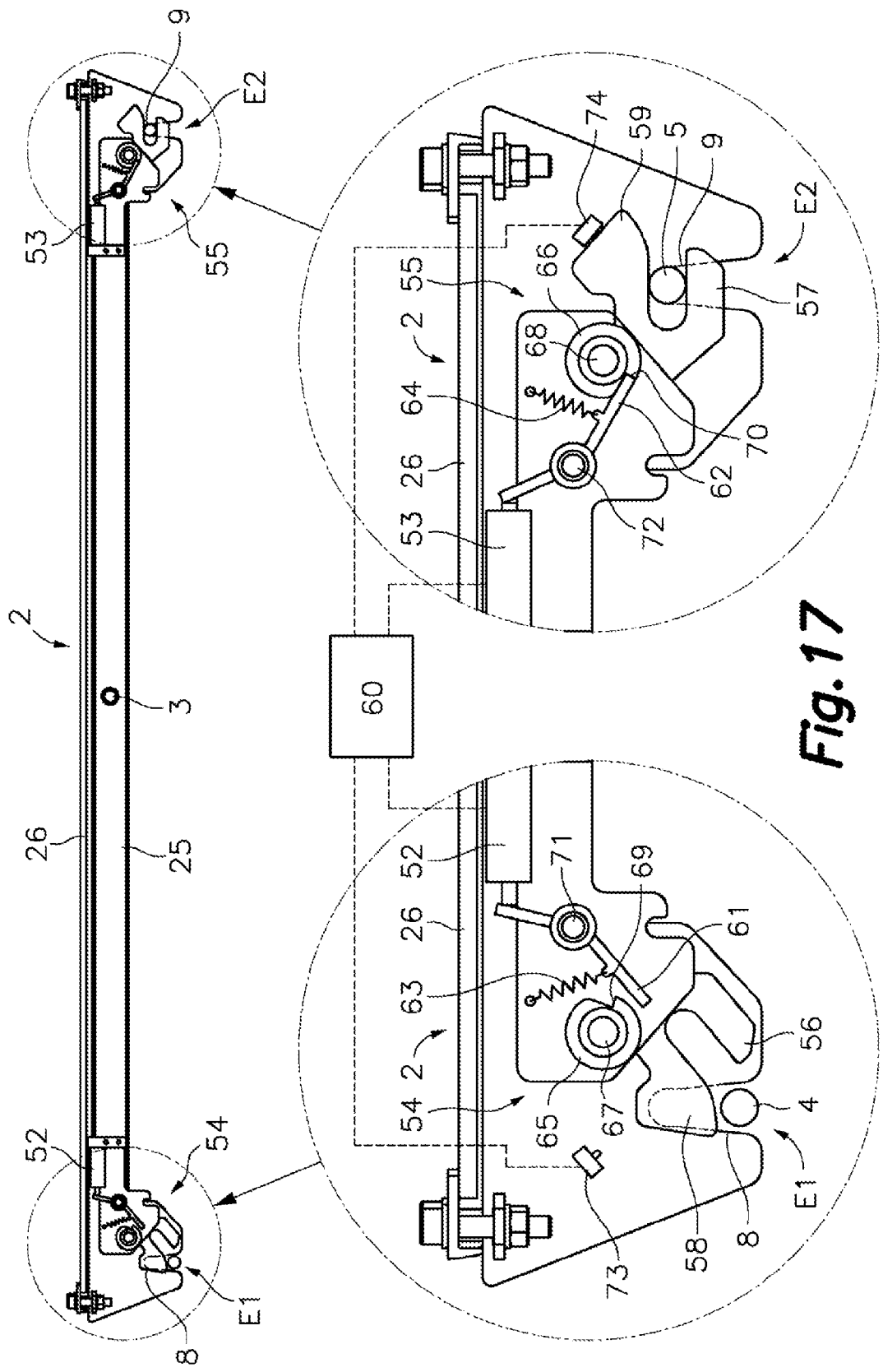
FIG. 17 is a side elevational view of the solar panel of the solar tracker of FIGS. 13 to 15 with two enlarged details showing the arrangement of the connection/disconnection mechanisms when the solar tracker is in the western-oriented position.
Figure 18:
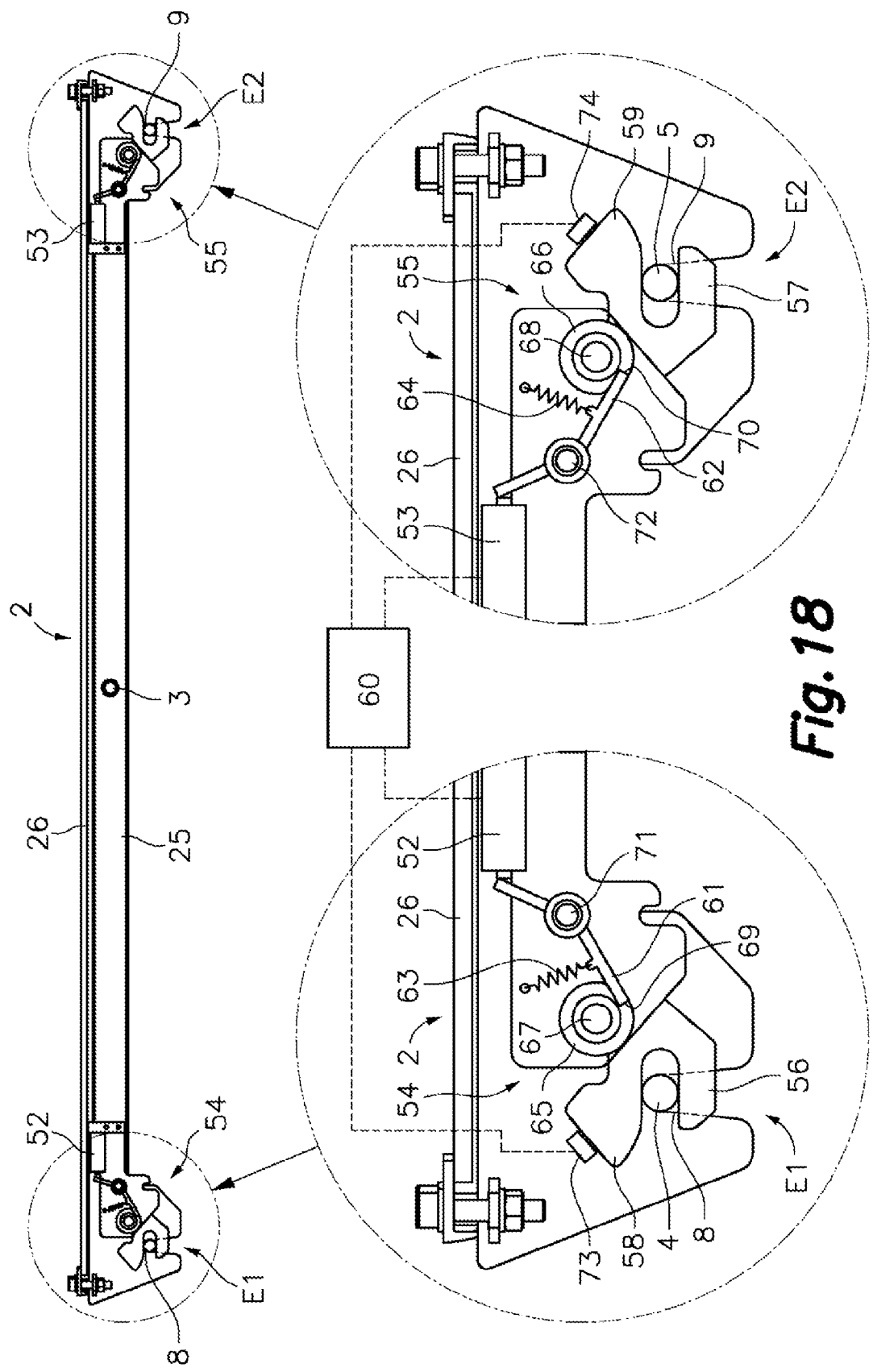
FIG. 18 is a side elevational view of the solar panel of the solar tracker of FIGS. 13 to 15 with two enlarged details showing the arrangement of the connection/disconnection mechanisms when the solar tracker is in the horizontal position in a secure storage mode.

In this third embodiment better shown in FIGS. 16 to 18, the first connection/disconnection mechanism 54 comprises a first closing element 56 which can rotate around a first closing shaft 67 between a closed position (on the left in FIGS. 16 and 18), in which said first closing element 56 retains the first journal 4 coupled to the first half-bearing 8, and an open position (on the left in FIG. 17), in which the first closing element 56 allows coupling and decoupling the first journal 4 to/from the first half-bearing 8. Similarly, the second connection/disconnection mechanism 55 comprises a second closing element 57 which can rotate around a second closing shaft 68 between a closed position (on the right in FIGS. 17 and 18), in which the second closing element 57 retains the second journal 5 coupled to the second half-bearing 9, and an open position (on the right in FIG. 16), in which the second closing element 57 allows coupling and decoupling the second journal to/from of the second half-bearing 9.

The first connection/disconnection mechanism 54 further comprises a first activation lever 58 positioned such that it is pushed from a stand-by position to an activation position by the first journal 4 when the solar panel 2 pivoting around the second shaft E2 reaches said position parallel to the base 1. This first activation lever 58 integrally rotates with the first closing element 56 such that when the first activation lever 58 is moved to its activation position it rotates the first closing element 56 from its open position to its closed position. Similarly, the second connection/disconnection mechanism 55 comprises a second activation lever 59 positioned such that it is pushed from a stand-by position to an activation position by the second journal 5 when the solar panel 2 pivoting around the second shaft E2 reaches said position parallel to the base 1. The mentioned second activation lever 59 integrally rotates with the second closing element 57, such that when the second activation lever 59 is moved to its activation position it rotates the second closing element 57 from its open position to its closed position.

Furthermore, the first closing element 56 is configured and arranged such that it is moved from its closed position to its open position by the first journal 4 when the solar panel 2 starts to pivot around the second shaft E2 from the position parallel to the base 1. Similarly, the second journal 5 moves the second closing element 57 from its closed position to its open position when the solar panel 2 starts to pivot around the first shaft E1 from the position parallel to the base 1. A first cam 65 integrally rotates with the first closing element 56 and the first activation lever 58 around the first closing shaft 67, and a second cam 66 integrally rotates with the second closing element 57 and the second activation lever 59 around the second closing shaft 68. These first and second cams 65, 66 have respective peripheral support surfaces and respective first and second interlocking elements 69, 70 in the form of notches in said peripheral support surfaces.

In this third embodiment, the first connection/disconnection mechanism 54 further comprises a first locking member 61 which can rotate around a first locking shaft 71 parallel to said first closing shaft 67 between a locked position, in which said first locking member 61 is interlocked in the mentioned first interlocking element 69 and thereby locks the first closing element 56 in said closed position, and an unlocked position, in which the first locking member 61 is released from the first interlocking element 69 and allows the first closing element 56 to move freely between said closed and open positions. Similarly, the second connection/disconnection mechanism 55 comprises a second locking member 62 which can rotate around a second locking shaft 72 parallel to said second closing shaft 68 between a locked position, in which said second locking member 62 is interlocked in said second interlocking element 70 and thereby locks the second closing element 57 in said closed position, and an unlocked position, in which the second locking member 62 is released from the second interlocking element 70 and allows the second closing element 57 to move between its closed and open positions.

A first elastic element 63, such as a metal spring, pushes the first locking member 61 towards its locked position and the mentioned first connection/disconnection actuator 52, which in this third embodiment is, for example, an electromagnetic actuator, is arranged for pushing first locking member 61 towards its unlocked position against the force of said first elastic element 63. Similarly, a second elastic element 64 pushes the second locking member 62 towards its locked position and said second connection/disconnection actuator 53, which can also comprise an electromagnetic actuator, is arranged for pushing the second locking member 62 towards its unlocked position against the force of said second elastic element 64.

In a tracking mode, when the electronic control means 60 activate the operation of one of the first and second connection/disconnection actuators 52, 53 from a closed position (as shown on the left in FIGS. 16 and 18 or on the right in FIGS. 17 and 18), the latter act on the corresponding first or second locking member 61, 62 and unlock it from the first interlocking element 69. The electronic control means 60 then activate the operation of the lifting/lowering actuator 10 to start lifting the panel 2, whereby the corresponding journal 4, 5 moves the closing element 56, 57, which has just been released, towards its open position while the solar panel 2 starts to pivot around the opposite shaft E1, E2, which remains connected and with the corresponding connection/disconnection mechanism 54, 55 locked.

The lifting movement of the solar panel 2 is started while the locking member 61, 62 is kept in its unlocked position by the corresponding connection/disconnection actuator 52, 53. When the cam 65, 66 has rotated a certain angle, the operation of the corresponding connection/disconnection actuator 52, 53 can be deactivated since the locking member 61, 62 pushed by the elastic element 63, 64 is supported on the peripheral support surface and keeps the connection/disconnection mechanism 54, 55 released.

When one of the first or second ends 2a, 2b of the solar panel 2 is coupled with the base 1 from an open position (as shown on the right in FIG. 16 or on the left in FIG. 17), the corresponding journal 4, 5 acts on the activation lever 58, 59 and the latter moves the closing element 56, 57 towards its closed position, which causes a rotation of the corresponding cam 65, 66 and the interlocking of the locking member 61 in the interlocking element 69, 70 by the action of the corresponding elastic element 63, whereby the corresponding connection/disconnection mechanism 54, 55 is connected and locked.

In a secure storage mode (FIG. 18), and from a position of the solar panel 2 parallel to the base 1, the electronic control means 60 do not activate the operation of any of the first and second connection/disconnection actuators 52, 53, such that the first and second shafts E1, E2 formed by the first and second journals 4, 5 are trapped and locked by their respective connection/disconnection mechanisms 54, 55, whereby both ends 2a, 2b of the solar panel 2 are connected to the base 1 at the same time.

Figure 19:
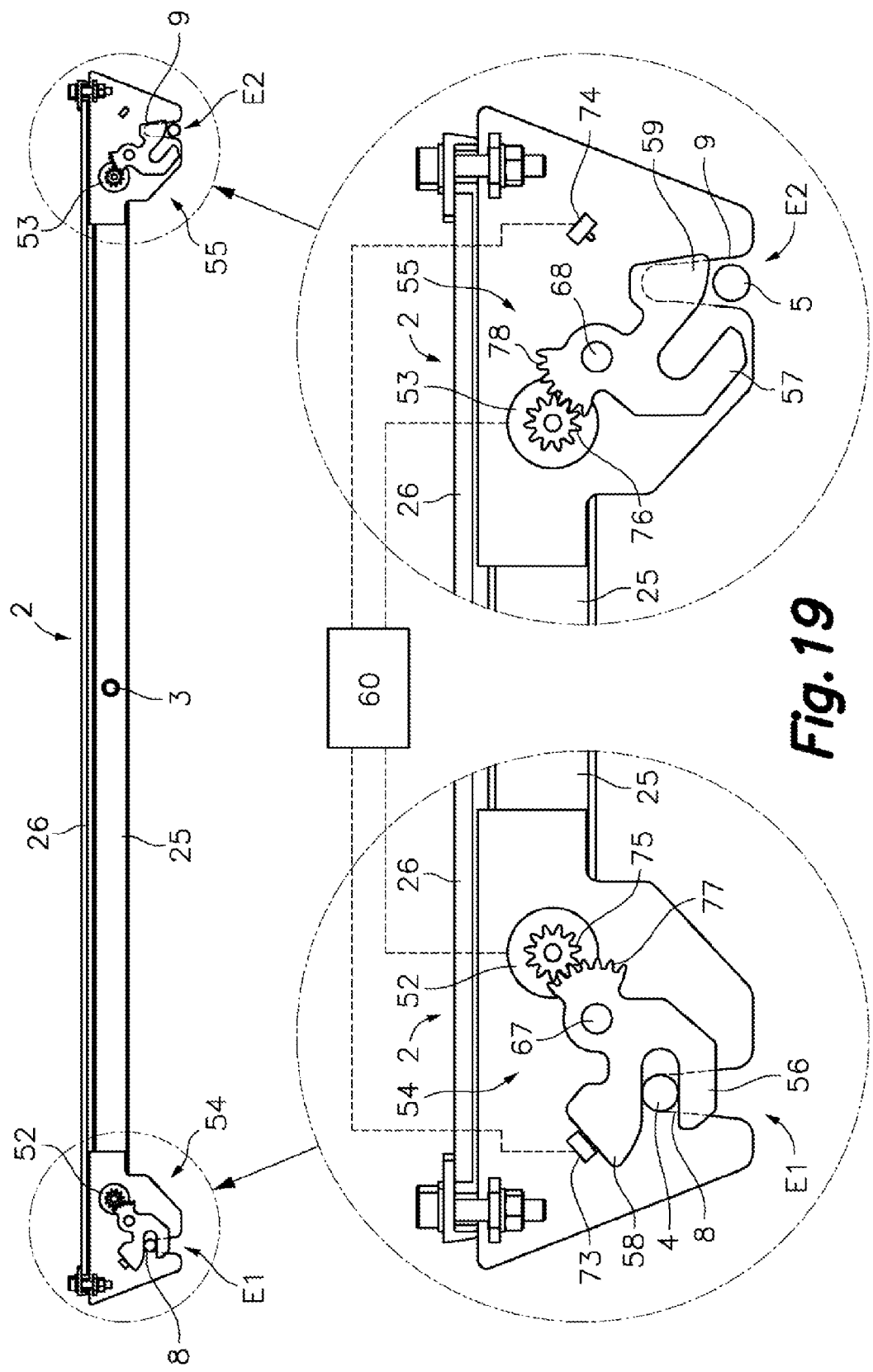
FIG. 19 is a side elevational view of a solar panel of a solar tracker according to a variant of the third embodiment of the present invention with two enlarged details showing the arrangement of connection/disconnection mechanisms when the solar tracker is in the eastern-oriented position in a tracking mode.

Now in reference to FIG. 19, it shows a variant of the third embodiment of the connection/disconnection mechanisms 54, 55. The first connection/disconnection mechanism 54 comprises a first closing element 56 which can rotate around a first closing shaft 67 between a closed position (on the left in FIG. 19), in which said first closing element 56 retains the first journal 4 coupled to the first half-bearing 8, and an open position (not shown), in which the first closing element 56 allows coupling an decoupling the first journal 4 to/from the first half-bearing 8. Similarly, the second connection/disconnection mechanism 55 comprises a second closing element 57 which can rotate around a second a closing shaft 68 between a closed position (not shown), in which the second closing element 57 retains the second journal 5 coupled to the second half-bearing 9, and an open position (on the right in FIG. 19), in which the second closing element 57 allows coupling and decoupling the second journal 5 to/from the second half-bearing 9.

The first connection/disconnection mechanism 54 includes a first connection/disconnection actuator 52, which is operatively connected for moving said first closing element 56 between its open position and its closed position. In the example illustrated in FIG. 19, the mentioned first connection/disconnection actuator 52 is an electric motor which rotates a first cogwheel 75 meshed with a first gear wheel sector 77 integrally rotating with the first closing element 56. Similarly, the second connection/disconnection mechanism 55 includes a second connection/disconnection actuator 53, which comprises an electric motor that rotates a second cogwheel 76 meshed with a second gear wheel sector 78 integrally rotating with the second closing element 57, such that the second connection/disconnection actuator 53 is operatively connected for moving said second closing element 57 between its open position and its closed position.

A person skilled in the art will be capable of introducing variations and modifications in the first and second connection/disconnection mechanisms 54, 55 without departing from the scope of the present invention, and the first and second connection/disconnection actuators 52, 53 can be selected from a group comprising comprises electric motors, electromagnetic actuators, hydraulic actuators and pneumatic actuators.

Figure 20:
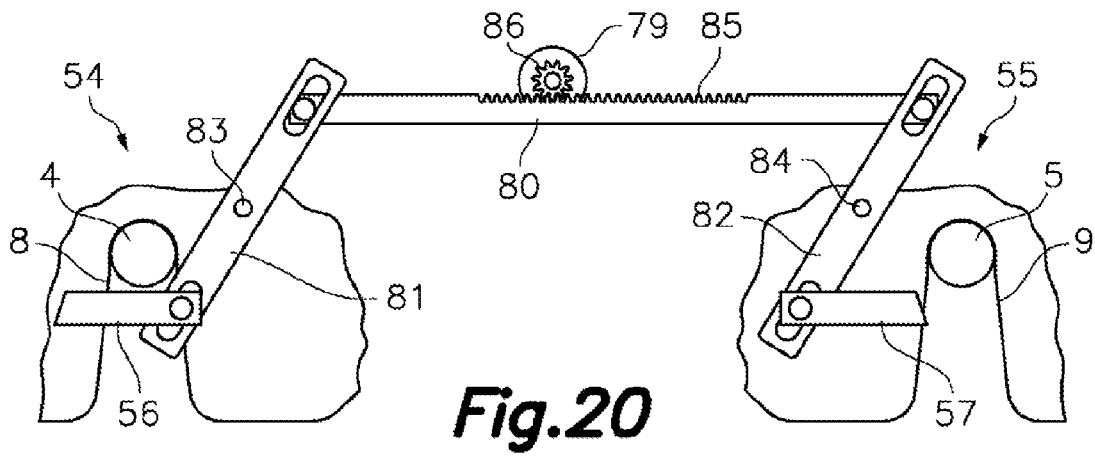
FIGS. 20 to 22 are schematic side views of an automatic connection/disconnection device of a solar tracker according to another variant of the third embodiment of the present improvements in first, second and third positions.
Figure 21:
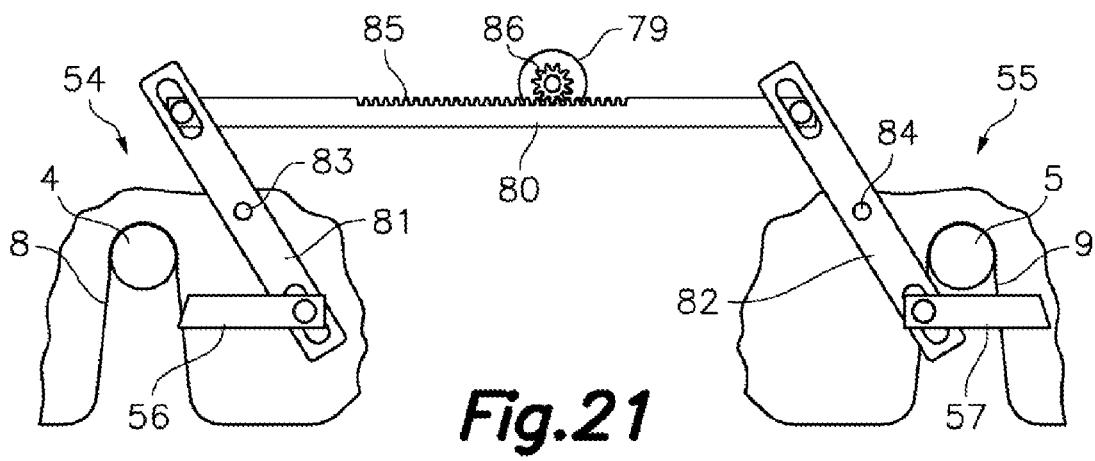
Figure 22:
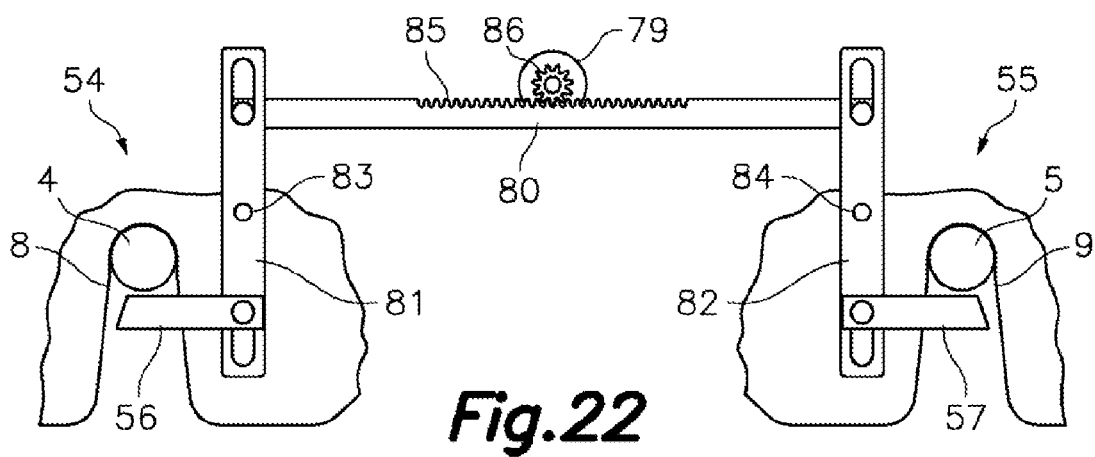

FIGS. 20 to 22 show another variant of the third embodiment, where the first and second connection/disconnection mechanisms 54, 55 are moved by a single connection/disconnection actuator 79. To that end, each of the first and second closing elements 56, 57 is linearly movable between an open position (on the right in FIG. 20 and on the left in FIG. 21), a first closed position (on the left in FIG. 20 and on the right in FIG. 21), and a second closed position (on the left and right in FIG. 22). The first and second connection/disconnection mechanisms 54, 55 comprise respective first and second rockers 81, 82 installed such that they can rotate around respective shafts 83, 84. Each of these first and second rockers 81, 82 have an end connected in an articulated manner to the corresponding first and second closing element 56, 57 and another end connected in an articulated manner to a linking member 80 kinematically linking the first and second connection/disconnection mechanisms 54, 55 to one another.

Said linking member 80 has a rack gearing 85 and a single connection/disconnection actuator 79 rotating a cogwheel 86 meshed with said rack gearing 85. Thus, the mentioned single connection/disconnection actuator 79 kinematically moves the first and second connection/disconnection mechanisms 54, 55 together between a first position (FIG. 20), in which the first closing element 56 is in its first closed position and the second closing element 57 is in its open position, a second position (FIG. 21), in which the first closing element 56 is in its open position and the second closing element 57 is in its first closed position, and a third position (FIG. 22), in which both first and second closing elements 56, 57 are in their respective second closed positions.

The electronic control means 60 in cooperation with detection means (not shown) control the operation of the single connection/disconnection actuator 79 for providing a tracking mode, in which the first and second connection/disconnection mechanisms 54, 55 alternate the first and second positions (FIGS. 20 and 21), and a secure storage mode, in which the first and second connection/disconnection mechanisms 54, 55 are in the third position (FIG. 22).

A person skilled in the art will understand that the mechanisms of this variant of the third embodiment allow multiple variations and alternatives with a similar result, provided that the first and second closing elements 56, 57 allow one open position and two closed positions, the first and second connection/disconnection mechanisms 54, 55 are kinematically linked by a linking member 80, and a single connection/disconnection actuator 79 is operatively connected for moving the first and second connection/disconnection mechanisms 54, 55 between three positions equivalent to those described above. The single connection/disconnection actuator 79 can be selected from a group comprising an electric motor, an electromagnetic actuator, a hydraulic actuator and a pneumatic actuator.

In this third embodiment and in any of its variants described above, the electronic control means 60 can be programmable and can include a user interface whereby a user can establish a program, select the tracking mode or the secure storage mode, etc. The aforementioned detection means comprise first and second micro switches 73 arranged for detecting the first and second activation levers 58, 59 in their activation positions, respectively, which are equivalent to the closed positions of the first and second closing element 56, 57.

Alternatively, the first and second micro switches 73, 74 could be arranged for detecting any one of the mobile components of the corresponding first and second connection/disconnection mechanisms 54, 55 when said mobile component was in a position indicating that the first or second end 2a, 2b of the solar panel 2 is connected to the base 1 with a similar result. Alternatively, at least one position detector, or even a single position detector, such as a micro switch, could be arranged for detecting the position of the solar panel 2 parallel to the base 1.

The scope of the present invention is defined in the attached claims.

The invention claimed is:

1. A solar tracker comprising:
   a base;
   a solar panel having first and second opposite ends, wherein said first end can be connected to said base by a first shaft and the second end can be connected to the base by a second shaft parallel to the first shaft, such that said solar panel pivots with respect to the base around said first shaft when the first end is connected to the base and the second end is disconnected from the base and the solar panel pivots with respect to the base around said second shaft when the second end is connected to the base and the first end is disconnected from the base;
   a lifting mechanism installed in the base and connected to the solar panel in an intermediate region between said first and second ends;
   a lifting/lowering actuator moving said lifting mechanism and thereby pivoting said solar panel around the first shaft or the second shaft between a position parallel to the base and at least two raised positions, said at least two raised positions each having an inclination with respect to the base according to the relative movements of the sun;
   an automatic connection/disconnection device connecting the second end of the solar panel to the base and disconnecting the first end of the solar panel from the base and connecting the first end of the solar panel to the base and disconnecting the second end of the solar panel from the base as the solar panel reaches said position parallel to the base for inverting the inclination of the solar panel with respect to the base when the lifting mechanism is driven for moving the solar panel from the position parallel to the base towards one of the at least two raised positions;
   wherein said lifting mechanism comprises:
   first and second movable arms having respective first ends connected by a first articulation to a central region of the solar panel, said first movable arm having a second end connected by a second articulation to a first movable support and said second movable arm having a second end connected by a third articulation to a second movable support;
   a first nut fixed to said first movable support, and a second nut fixed to said second movable support;
   a screw supported on the base and rotatably driven by said lifting/lowering actuator, said screw having a rotation axis perpendicular to the first and second shafts and parallel to the base, and first and second threaded portions having opposite thread directions; and
   a guide provided in the base, said guide being parallel to said rotation axis of the screw;
   wherein said first and second nuts are respectively coupled to said first and second threaded portions of the screw; and
   wherein said first and second movable supports, the first and second nuts and the screw are freely movable along the guide.

2. The solar tracker according to claim 1, characterized in that said first shaft is defined by at least a first journal fixed to the base and at least a corresponding first half-bearing fixed to the solar panel, said first half-bearing receiving said first journal in a radial direction when the solar panel reaches said position parallel to the base, and said second shaft is defined by at least a second journal fixed to the base and at least a corresponding second half-bearing fixed to the solar panel, said second half-bearing receiving said second journal in a radial direction when the solar panel reaches said position parallel to the base.

3. The solar tracker according to claim 2, characterized in that said automatic connection/disconnection device is mounted on the solar panel and comprises at least a first closing element movable relative to said first half-bearing between a closed position, in which said first closing element retains the first journal coupled to the first half-bearing, and an open position, in which the first closing element allows the first journal to be coupled and decoupled to/from the first half-bearing, and at least a second closing element movable relative to said second half-bearing between a closed position, in which the second closing element retains the second journal coupled to the second half-bearing, and an open position, in which the second closing element allows the second journal to be coupled and decoupled to/from the second half-bearing.

4. The solar tracker according to claim 3, characterized in that said automatic connection/disconnection device comprises:
 a first connection/disconnection mechanism connecting/disconnecting the first end of the solar panel to/from the base;
 a second connection/disconnection mechanism connecting/disconnecting the second end of the solar panel to/from the base;
 at least one electrically driven connection/disconnection actuator cooperating with said first and second connection/disconnection mechanisms;
 a detector arranged for detecting at least the position of the solar panel parallel to the base; and
 said at least one electrically driven connection/disconnection actuator being electronically controlled in cooperation with said detector for connecting the second end of the solar panel to the base by said second connection/disconnection mechanism while at the same time disconnecting the first end of the solar panel from the base by said first connection/disconnection mechanism when the solar panel is in the position parallel to the base, and for connecting the first end of the solar panel to the base by said first connection/disconnection mechanism while at the same time disconnecting the second end of the solar panel from the base by means of said second connection/disconnection mechanism when the solar panel is in the position parallel to the base to provide a tracking mode.

5. The solar tracker according to claim 4, characterized in that the at least one electrically driven connection/disconnection actuator is electronically controlled in cooperation with the detection means for connecting both the first and second ends of the solar panel to the base by the first and second connection/disconnection mechanisms when the solar panel is in the position parallel to the base, thereby providing a secure storage mode.

6. The solar tracker according to claim 4, characterized in that said first connection/disconnection mechanism further comprises a first locking member movable between a locked position, wherein said first locking member locks the first closing element in said closed position, and an unlocked position, wherein the first locking member allows the first closing element to move between said closed and open positions, and said second connection/disconnection mechanism comprises a second locking movable member between a locked position, wherein said second locking member locks the second closing element in said closed position, and an unlocked position, wherein the second locking member allows the second closing element to move between said closed and open positions.

7. The solar tracker according to claim 6, characterized in that a first elastic element pushes the first locking member towards its locked position and a first electrically driven connection/disconnection actuator is arranged for pushing the first locking member towards its unlocked position against the force of said first elastic element, a second elastic element pushes the second locking member towards its locked position and a second electrically driven connection/disconnection actuator is arranged for pushing the second locking member towards its unlocked position against the force of said second elastic element.

8. The solar tracker according to claim 7, characterized in that the first closing element moves a first cam which keeps the first locking member in its unlocked position while the first closing element is in its open position, and the second closing element moves a second cam which keeps the second locking member in its unlocked position while the second closing element is in its open position.

9. The solar tracker according to claim 8, characterized in that the first connection/disconnection mechanism further comprises a first activation lever movable between a stand-by position and to an activation position, a first element attached to the base pushing said first activation lever from said stand-by position to said activation position when the solar panel pivoting around the second shaft reaches said position parallel to the base, said first activation lever moving said first closing element from its open position to its closed position when the first activation lever is moved to its activation position, and the second connection/disconnection mechanism further comprises a second activation lever movable between a stand-by position and an activation position, a second element attached to the base pushing said second activation lever from said stand-by position to said activation position when the solar panel pivoting around the first shaft reaches said position parallel to the base, said second activation lever moving said second closing element from its open position to its closed position when the second activation lever is moved to its activation position.

10. The solar tracker according to claim 9, characterized in that said first element attached to the base moves the first closing element from its closed position to its open position when the solar panel starts to pivot around the second shaft from the position parallel to the base and while the first locking member is kept in its unlocked position by said first electrically driven connection/disconnection actuator, and said second element attached to the base moves the second closing element from its closed position to its open position when the solar panel starts to pivot around the first shaft from the position parallel to the base and while the second locking member is kept in its unlocked position by said electrically driven second connection/disconnection actuator.

11. The solar tracker according to claim 10, characterized in that the first closing element, the first activation lever and said first cam integrally rotate around a first closing shaft, and the second closing element, the second activation lever and said second cam integrally rotate around a second closing shaft.

12. The solar tracker according to claim 11, characterized in that the first cam comprises a first interlocking element wherein the first locking member is interlocked in its locked position, and the second cam comprises a second interlocking element wherein the second locking member is interlocked in its locked position.

13. The solar tracker according to claim 4, characterized in that a first electrically driven connection/disconnection actuator moves said first closing element between its open position and its closed position, and a second electrically driven connection/disconnection actuator moves said second closing element between its open position and its closed position.

14. The solar tracker according to claim 5, characterized in that each of said first and second closing elements is movable between an open position, a first closed position, and a second closed position, and said first and second connection/disconnection mechanisms are kinematically linked to one another by a linking member such that they are movable together between a first position, wherein the first closing element is in its first closed position and the second closing element is in its open position, a second position, wherein the first closing element is in its open position and the second closing element is in its first closed position, and a third position, wherein both first and second closing elements are in their respective second closed positions.

15. The solar tracker according to claim 14, characterized in that a single electrically driven connection/disconnection actuator moves said linking member or at least one mobile element of one of the first and second connection/disconnection mechanisms between said first, second and third positions.

16. A solar tracker comprising:
a base;
a solar panel having first and second opposite ends, wherein said first end can be connected to said base by a first shaft and the second end can be connected to the base by a second shaft parallel to the first shaft, such that said solar panel can pivot with respect to the base around said first shaft when the first end is connected to the base and the second end is disconnected from the base and the solar panel can pivot with respect to the base around said second shaft when the second end is connected to the base and the first end is disconnected from the base;
a lifting mechanism installed in the base and connected to the solar panel in an intermediate region between said first and second ends;
a lifting/lowering actuator moving said lifting mechanism and thereby pivoting said solar panel around the first shaft or the second shaft between a position parallel to the base and at least two raised positions, said at least two raised positions each having an inclination with respect to the base according to the relative movements of the sun;
an automatic connection/disconnection device connecting the second end of the solar panel to the base while at the same time disconnecting the first end of the solar panel from the base and connecting the first end of the solar panel to the base while at the same time disconnecting the second end of the solar panel from the base when the solar panel reaches said position parallel to the base for inverting the inclination of the solar panel with respect to the base when the lifting mechanism is driven for moving the solar panel from the position parallel to the base towards one of the at least two raised positions;
wherein said lifting mechanism comprises:
first and second movable arms having respective first ends connected by a first articulation to a central region of the solar panel of the based by a first articulation,
said first movable arm has a second end connected by a second articulation to a first movable support in which a first nut is fixed;
said second movable arm having a lower end connected by a third articulation to a second movable support in which said second nut is fixed;
a first nut fixed to said first movable support, and a second nut fixed to said second movable support;
said first and second nuts are respectively coupled to first and second threaded portions of a screw supported on the base or on the solar panel and rotatably driven by said lifting/lowering actuator, said first and second threaded portions of said screw having opposite thread directions; and
a guide provided in the base, said guide being parallel to said rotation axis of the screw;
wherein said first and second nuts are respectively coupled to said first and second threaded portions of the screw; and
wherein said first and second movable supports are coupled to the guide such that the first and second movable supports, the first and second nuts and the screw are freely movable along the guide.

17. The solar tracker according to claim 16, characterized in that said first shaft is defined by at least a first journal fixed to the base and at least a corresponding first half-bearing fixed to the solar panel, said first half-bearing being configured and arranged for receiving said first journal in a radial direction when the solar panel reaches said position parallel to the base, and said second shaft is defined by at least a second journal fixed to the base and at least a corresponding second half-bearing fixed to the solar panel, said second half-bearing being configured and arranged for receiving said second journal in a radial direction when the solar panel reaches said position parallel to the base.

18. The solar tracker according to claim 17, characterized in that said solar panel comprises a support structure supporting at least one photovoltaic panel, and in that said first and second half-bearings together with the automatic connection/disconnection device are fixed to said support structure of the solar panel and said first and second journals are fixed to the base.

19. The solar tracker according to claim 17, characterized in that said automatic connection/disconnection device comprises at least a first closing element movable relative to said first half-bearing between a closed position, in which said first closing element retains the first journal coupled to the first half-bearing, and an open position, in which the first closing element allows the first journal to be coupled and decoupled to/from the first half-bearing, and at least a second closing element movable relative to said second half-bearing between a closed position, in which the second closing element retains the second journal coupled to the second half-bearing, and an open position, in which the second closing element allows the second journal to be coupled and decoupled to/from the second half-bearing.

20. The solar tracker according to claim 19, characterized in that said automatic connection/disconnection device further comprises at least one linking member kinematically linking said first and second closing elements to one another such that when the first closing element is moved to said open position the second closing element is moved to said closed position, and when the first closing element is moved to the closed position the second closing element is moved to the open position.

21. The solar tracker according to claim 20, characterized in that the automatic connection/disconnection device further comprises at least one elastic element installed in an arrangement whereby said elastic element pushes said first and second closing elements towards their closed and open positions from an intermediate neutral position.

22. The solar tracker according to claim 21, characterized in that the automatic connection/disconnection device further comprises a first activation lever movable between a stand-by position and an activation position, a first element attached to the base pushing said first activation lever from said stand-by position to said activation position when the solar panel pivoting around the second shaft reaches said position parallel to the base, said first activation lever being kinematically linked to a first pusher moving said first closing element from the open position to beyond said intermediate neutral position when the first activation lever is pushed to said activation position, and a second activation lever movable between a stand-by position to an activation position, a second element attached to the base pushing said second activation lever from said stand-by position to said activation position when the solar panel pivoting around the first shaft reaches said position parallel to the base, said second activation lever being kinematically linked to a second pusher moving said second closing element from the open position to beyond said intermediate neutral position when the second activation lever is pushed to said activation position.

23. The solar tracker according to claim 19, characterized in that said automatic connection/disconnection device further comprises a first locking member movable between a locked position, in which said first locking member locks the first closing element in said closed position, and an unlocked position, in which the first locking member allows the first closing element to move between said closed and open positions, a second locking member movable between a locked position, in which said second locking member locks the second closing element in said closed position, and an unlocked position, in which the second locking member allows the second closing element to move between said closed and open positions, and a linking member kinematically linking said first and second locking members to one another such that when the first locking member is moved to said locked position the second locking member is moved to said unlocked position, and when the second locking member is moved to said locked position the first locking member is moved to said unlocked position.

24. The solar tracker according to claim 23, characterized in that the automatic connection/disconnection device further comprises at least one elastic element installed in an arrangement whereby said elastic element pushes said first and second locking members towards their locked and unlocked positions from an intermediate neutral position.

25. The solar tracker according to claim 24, characterized in that the automatic connection/disconnection device further comprises a first activation lever movable between a stand-by position and an activation position, a first element attached to the base pushing said first activation lever from said stand-by position to said activation position when the solar panel pivoting around the second shaft reaches said position parallel to the base, said first activation lever being kinematically linked to a first pusher moving said first locking member from the unlocked position to beyond said intermediate neutral position when the first activation lever is pushed to said activation position, and a second activation lever movable between a stand-by position to an activation position, a second element attached to the base pushing said second activation lever from said stand-by position to said activation position when the solar panel pivoting around the first shaft reaches said position parallel to the base, said second activation lever being kinematically linked to a second pusher moving said second locking member from the unlocked position to beyond said intermediate neutral position when the second activation lever is pushed to said activation position.

26. A solar tracker comprising:
a base;
a solar panel having first and second opposite ends, wherein said first end can be connected to said base by a first shaft and the second end can be connected to the base by a second shaft parallel to the first shaft, such that said solar panel pivots with respect to the base around said first shaft when the first end is connected to the base and the second end is disconnected from the base and the solar panel pivots with respect to the base around said second shaft when the second end is connected to the base and the first end is disconnected from the base;
a lifting mechanism connected to the base and to the solar panel in an intermediate region between said first and second ends;
a lifting/lowering actuator moving said lifting mechanism and thereby pivoting said solar panel around the first shaft or the second shaft between a position parallel to the base and at least two raised positions, said at least two raised positions each having an inclination with respect to the base according to the relative movements of the sun;
an automatic connection/disconnection device connecting the second end of the solar panel to the base and disconnecting the first end of the solar panel from the base and connecting the first end of the solar panel to the base and disconnecting the second end of the solar panel from the base as the solar panel reaches said position parallel to the base for inverting the inclination of the solar panel with respect to the base when the lifting mechanism is driven for moving the solar panel from the position parallel to the base towards one of the at least two raised positions;
wherein said lifting mechanism comprises:
first and second movable arms having respective first ends connected by a first articulation to a central region of the base, said first movable arm having a second end connected by a second articulation to a first movable support and said second movable arm having a second end connected by a third articulation to a second movable support;
a first nut fixed to said first movable support, and a second nut fixed to said second movable support;
a screw coupled to the base supported on the solar panel and rotatably driven by said lifting/lowering actuator, said screw having a rotation axis perpendicular to the first and second shafts and parallel to the base, and first and second threaded portions having opposite thread directions; and
a guide coupled to the base provided in the solar panel, said guide being parallel to said rotation axis of the screw;
wherein said first and second nuts are respectively coupled to said first and second threaded portions of the screw; and
wherein said first and second movable supports are coupled to the guide such that the first and second movable supports, the first and second nuts and the screw are freely movable along the guide.

* * * * *